US010026294B2

(12) United States Patent
Funakoshi et al.

(10) Patent No.: US 10,026,294 B2
(45) Date of Patent: Jul. 17, 2018

(54) INFORMATION PROCESSING SYSTEM, TERMINAL, INFORMATION PROCESSING METHOD, INFORMATION PROCESSING METHOD OF TERMINAL, AND PROGRAM

(71) Applicant: HONDA MOTOR CO., LTD., Tokyo (JP)

(72) Inventors: Kotaro Funakoshi, Wako (JP); Tomoyuki Sahata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/446,171

(22) Filed: Mar. 1, 2017

(65) Prior Publication Data

US 2017/0263101 A1  Sep. 14, 2017

(30) Foreign Application Priority Data

Mar. 9, 2016  (JP) .................................. 2016-046111

(51) Int. Cl.
G08B 21/00 (2006.01)
G08B 21/18 (2006.01)

(52) U.S. Cl.
CPC .................................. G08B 21/182 (2013.01)

(58) Field of Classification Search
CPC .................................................. G08B 21/182
USPC ..................... 340/636.1, 691.6; 705/2, 26.41
See application file for complete search history.

(56) References Cited

U.S. PATENT DOCUMENTS

| 2008/0088437 A1 | 4/2008 | Aninye et al. |
| 2008/0088438 A1 | 4/2008 | Aninye et al. |
| 2008/0195312 A1 | 8/2008 | Aaron et al. |
| 2009/0164823 A1 | 6/2009 | Aaltonen et al. |
| 2009/0275354 A1 | 11/2009 | Bulmer |
| 2011/0177830 A1 | 7/2011 | Clipsham |
| 2011/0188351 A1 | 8/2011 | Aaron et al. |
| 2011/0314402 A1 | 12/2011 | Kikin-Gil et al. |
| 2012/0034906 A1* | 2/2012 | Ueno ................. H04W 4/02 455/414.1 |
| 2012/0035925 A1 | 2/2012 | Friend et al. |
| 2013/0182128 A1 | 7/2013 | Amtrup et al. |
| 2014/0147092 A1 | 5/2014 | Liu et al. |

(Continued)

FOREIGN PATENT DOCUMENTS

JP  5055468  8/2012

OTHER PUBLICATIONS

U.S. Office Action dated Jan. 10, 2018 from corresponding U.S. Appl. No. 15/434,357, 12 pages.

Primary Examiner — Dhaval Patel
(74) Attorney, Agent, or Firm — Rankin, Hill & Clark LLP

(57) ABSTRACT

An information processing system is configured so that a terminal generates state information using information based on each of a first condition and a second condition in condition information, transmits condition information and state information to an information processing device, receives notification information from the information processing device, provides a notification of a reminder if the state information satisfies the first condition or the second condition, and controls stopping of an application according to a state of charge of the terminal and the information processing device generates notification information if the acquired state information satisfies first or second condition information.

10 Claims, 12 Drawing Sheets

(56) References Cited

U.S. PATENT DOCUMENTS

| | | |
|---|---|---|
| 2014/0181741 A1 | 6/2014 | Apacible et al. |
| 2014/0203940 A1 | 7/2014 | Bonner |
| 2015/0142897 A1 | 5/2015 | Alten et al. |
| 2015/0207926 A1 | 7/2015 | Brown et al. |
| 2015/0382138 A1 | 12/2015 | Bose et al. |
| 2016/0005299 A1 | 1/2016 | Zomet et al. |
| 2016/0210602 A1* | 7/2016 | Siddique ............ G06Q 20/0453 |
| 2016/0284199 A1 | 9/2016 | Dotan-Cohen et al. |
| 2017/0011426 A1* | 1/2017 | Marchenko ........ G06Q 30/0266 |
| 2017/0055898 A1 | 3/2017 | Bandyopadhyay et al. |
| 2017/0243468 A1 | 8/2017 | Dotan-Cohen et al. |

* cited by examiner

FIG. 2

| IDENTIFIER | TARGET POSITION INFORMATION | TARGET TIME INFORMATION | ... |
|---|---|---|---|
| ID1001 | AA BUILDING OF SHIBUYA | 17:00 ON JULY 7, 2015 | ... |

FIG. 3

| IDENTIFIER | CURRENT POSITION INFORMATION | CURRENT TIME INFORMATION | SENSOR INFORMATION | | |
|---|---|---|---|---|---|
| | | | MOVEMENT SPEED | TEMPERATURE | ... |
| ID1001 | LATITUDE XX1 LONGITUDE YY1 | 17:00 ON JULY 7, 2015 | ... | ... | ... |
| ID1001 | LATITUDE XX2 LONGITUDE YY2 | 18:50 ON JULY 9, 2015 | ... | ... | ... |
| ... | ... | ... | ... | ... | ... |

FIG. 4

| IDENTIFIER | COORDINATES OF TARGET POSITION | TARGET TIME INFORMATION | ... |
|---|---|---|---|
| ID1001 | COORDINATES OF AA BUILDING OF SHIBUYA | 17:00 ON JULY 7, 2015 | ... |
| ID1002 | COORDINATES OF AA BUILDING OF SHIBUYA | 18:30 ON JULY 8, 2015 | ... |
| ID1003 | COORDINATES OF BB BUILDING OF SHINJUKU | 21:00 ON JULY 7, 2015 | ... |
| ... | ... | ... | ... |

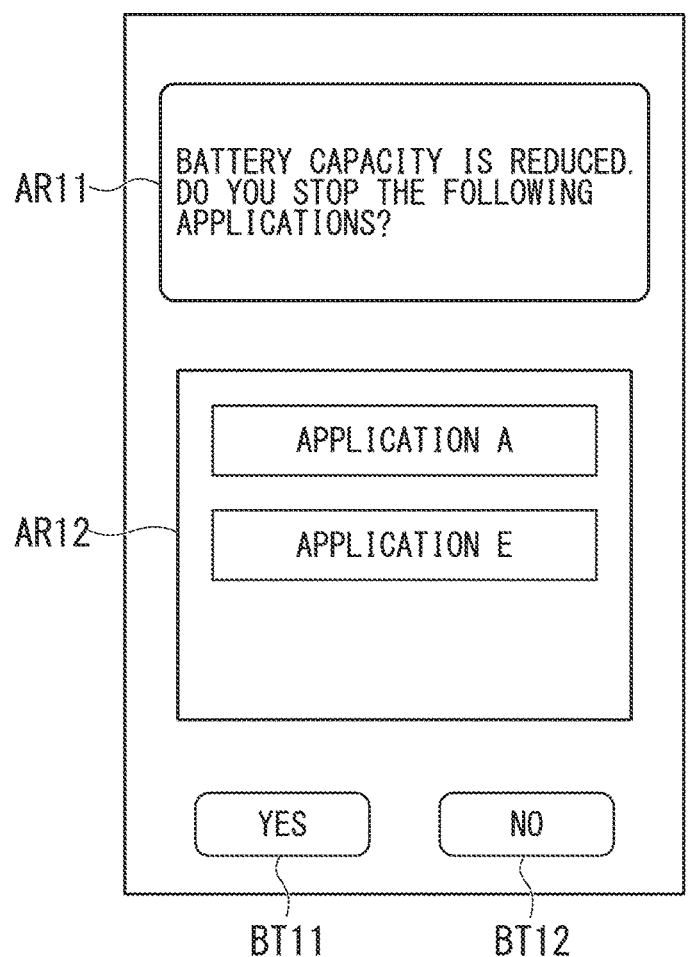

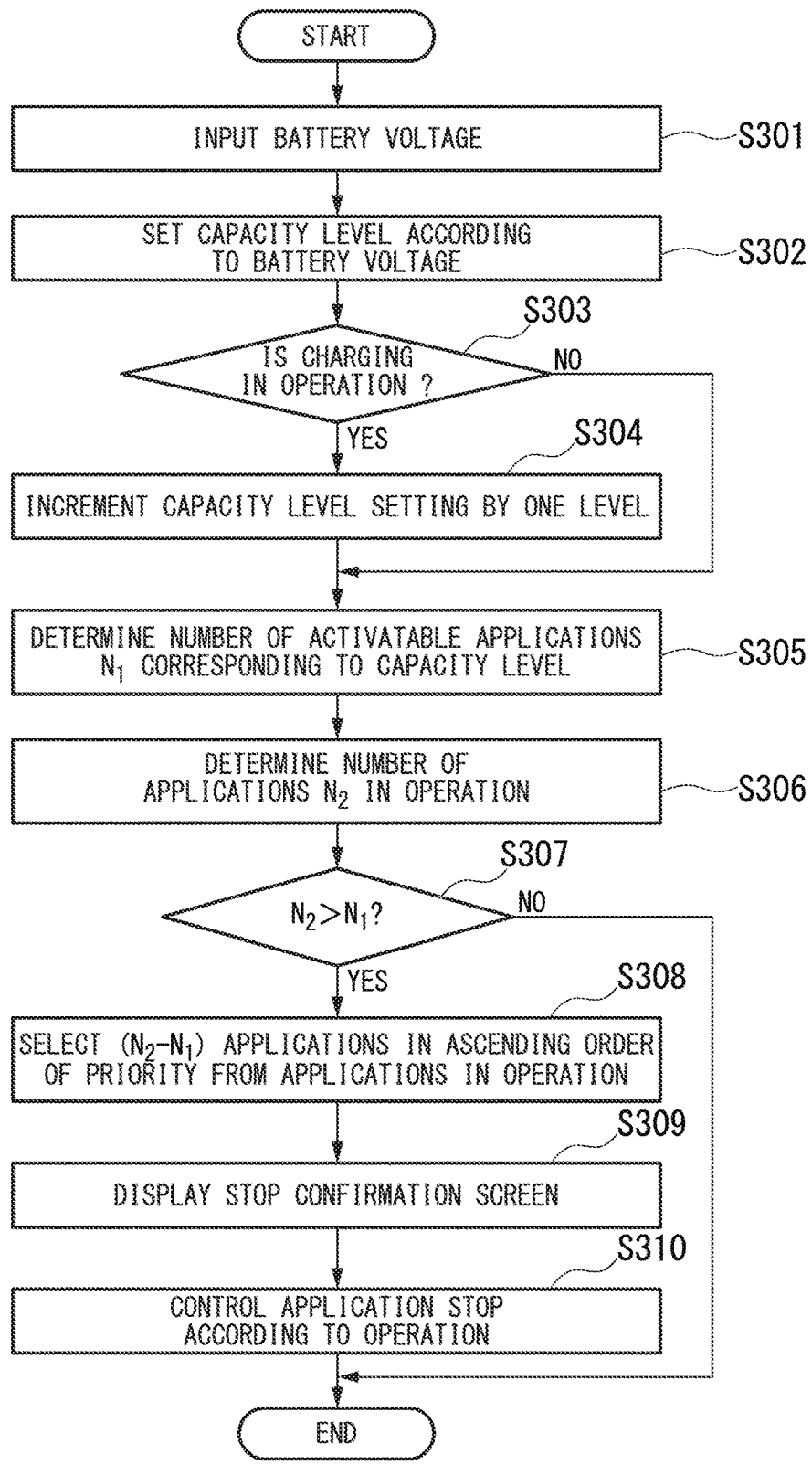

| AREA | CORRECTION VALUE |
|---|---|
| FIRST AREA | $\alpha_1$ |
| SECOND AREA | $\alpha_2$ |
| THIRD AREA | $\alpha_3$ |

INFORMATION PROCESSING SYSTEM, TERMINAL, INFORMATION PROCESSING METHOD, INFORMATION PROCESSING METHOD OF TERMINAL, AND PROGRAM

CROSS-REFERENCE TO RELATED APPLICATION

Priority is claimed on Japanese Patent Application No. 2016-046111, filed Mar. 9, 2016, the content of which is incorporated herein by reference.

BACKGROUND OF THE INVENTION

Field of the Invention

The present invention relates to an information processing system, a terminal, an information processing method, an information processing method of the terminal, and a program.

Description of Related Art

An information notification system configured so that a position and a time designated by a user are registered in a server and the server transmits notification information to the terminal if a current position received from the terminal of the user corresponds to the registered position and a current time corresponds to the registered time is known (for example, see Japanese Patent Publication No. 5055468 (hereinafter referred to as Patent Literature 1)).

SUMMARY OF THE INVENTION

However, in the information notification system of Patent Literature 1, both a position-related determination and a time-related determination are performed at a server side at the time of transmission of notification information. Thus, for example, if the number of users using the information notification system increases and the number of terminals increases, the processing load on the server is likely to increase.

Therefore, for example, processing being distributed so that the server performs one of the position-related determination and the time-related determination and the terminal performs the other when a notification of the notification information (i.e., a reminder) is provided can be conceived. However, in this case, power consumption increases due to a process in which the terminal side performs the position- or time-related determination. In this case, because the terminal having a reminder function is of a portable type and is generally driven by a battery, duration of the battery is shortened due to the increase of the power consumption.

An aspect according to the present invention has been made in view of the above-described circumstances, and an objective of the present invention is to provide an information processing system, a terminal, an information processing method, an information processing method of the terminal, and a program capable of suppressing the reduction of duration of a battery in a terminal in an information processing system configured so that a process is operated in the terminal and an information processing device in a distributed manner when a notification of a reminder is provided.

To achieve the above-described objective, the present invention adopts the following aspects.

(1) An aspect of the present invention is an information processing system including a terminal and an information processing device, wherein the terminal includes: a condition information generation unit configured to acquire a first condition and a second condition and generate condition information using at least one of the acquired first and second conditions; a state information generation unit configured to acquire information based on each of the first condition and the second condition and generate state information using information according to the condition information among the acquired information; a transmission unit configured to transmit the condition information to the information processing device and transmit the state information to the information processing device at predetermined time intervals; a reception unit configured to receive notification information from the information processing device; a reminder generation unit configured to generate a reminder if it is determined that the state information satisfies one of the first condition and the second condition when the notification information is received; a notification unit configured to provide a notification of the generated reminder; a state-of-charge detection unit configured to detect a state of charge in the terminal; and an application control unit configured to control an application which operates in the terminal according to the state of charge detected by the state-of-charge detection unit, and wherein the information processing device includes: an acquisition unit configured to acquire the condition information and the state information transmitted by the terminal; a condition determination unit configured to generate the notification information if it is determined that the acquired state information satisfies one of the first condition and the second condition included in the condition information; and an output unit configured to transmit the notification information to the terminal.

(2) In the above-described aspect (1), the information processing system may further include: a priority setting unit configured to set priorities for applications, wherein the application control unit determines an application which is a stop target according to the state of charge detected by the state-of-charge detection unit from among applications in operation on the basis of the priorities set by the priority setting unit.

(3) In the above-described aspect (2), the application control unit may set the number of simultaneously operable applications according to the state of charge detected by the state-of-charge detection unit.

(4) In the above-described aspect (3), the application control unit may correct the number of simultaneously operable applications on the basis of a distance between a target position indicated by target position information and a current position of the terminal as the first condition.

(5) In any one of the above-described aspects (1) to (4), the application control unit may display a stop confirmation screen for allowing a user to confirm whether to stop an application determined to be a stop target from among applications in operation according to the state of charge detected by the state-of-charge detection unit and stop the application designated to be stopped on the basis of an operation performed on the stop confirmation screen.

(6) In the above-described aspect (5), the application control unit may continue an operation on an application which is not designated to be stopped on the basis of an operation performed on the stop confirmation screen.

(7) An aspect of the present invention is a terminal including: a condition information generation unit configured to acquire a first condition and a second condition and generate condition information using at least one of the acquired first and second conditions; a state information generation unit configured to acquire information based on each of the first condition and the second condition and generate state information using information according to the condition information among the acquired information; a transmission unit configured to transmit the condition information to the information processing device and transmit the state information to the information processing device at predetermined time intervals; a reception unit configured to receive notification information from the information processing device; a reminder generation unit configured to generate a reminder if it is determined that the state information satisfies one of the first condition and the second condition when the notification information is received; a notification unit configured to provide a notification of the generated reminder; a state-of-charge detection unit configured to detect a state of charge in the terminal; and an application control unit configured to control an application which operates in the terminal according to the state of charge detected by the state-of-charge detection unit.

(8) An aspect of the present invention is an information processing method in an information processing system including a terminal and an information processing device, the information processing method including: a condition information generation procedure in which a condition information generation unit of the terminal acquires a first condition and a second condition and generates condition information using at least one of the acquired first and second conditions; a state information generation procedure in which a state information generation unit of the terminal acquires information based on each of the first condition and the second condition and generates state information using information according to the condition information among the acquired information; a transmission procedure in which a transmission unit of the terminal transmits the condition information to the information processing device and transmits the state information to the information processing device at predetermined time intervals; a reception procedure in which a reception unit of the terminal receives notification information from the information processing device; a reminder generation procedure in which a reminder generation unit of the terminal generates a reminder if it is determined that the state information satisfies one of the first condition and the second condition when the notification information is received; a notification procedure in which a notification unit of the terminal provides a notification of the generated reminder; a state-of-charge detection procedure in which a state-of-charge detection unit of the terminal detects a state of charge in the terminal; an application control procedure in which an application control unit of the terminal controls an application which operates in the terminal according to the state of charge detected by the state-of-charge detection unit; an acquisition procedure in which an acquisition unit of the information processing device acquires the condition information and the state information transmitted by the terminal; a condition determination procedure in which a condition determination unit of the information processing device generates the notification information if it is determined that the acquired state information satisfies one of the first condition and the second condition included in the condition information; and an output procedure in which an output unit of the information processing device transmits the notification information to the terminal.

(9) An aspect of the present invention is an information processing method of a terminal, the information processing method including: a condition information generation procedure in which a condition information generation unit acquires a first condition and a second condition and generates condition information using at least one of the acquired first and second conditions; a state information generation procedure in which a state information generation unit acquires information based on each of the first condition and the second condition and generates state information using information according to the condition information among the acquired information; a transmission procedure in which a transmission unit transmits the condition information to the information processing device and transmits the state information to the information processing device at predetermined time intervals; a reception procedure in which a reception unit receives notification information from the information processing device; a reminder generation procedure in which a reminder generation unit generates a reminder if it is determined that the state information satisfies one of the first condition and the second condition when the notification information is received; a notification procedure in which a notification unit provides a notification of the generated reminder; a state-of-charge detection procedure in which a state-of-charge detection unit detects a state of charge in the terminal; and an application control procedure in which an application control unit controls an application which operates in the terminal according to the state of charge detected in the state-of-charge detection procedure.

(10) An aspect of the present invention is a program for causing a computer of a terminal to execute: a condition information generation procedure of acquiring a first condition and a second condition and generating condition information using at least one of the acquired first and second conditions; a state information generation procedure of acquiring information based on each of the first condition and the second condition and generating state information using information according to the condition information among the acquired information; a transmission procedure of transmitting the condition information to the information processing device and transmitting the state information to the information processing device at predetermined time intervals; a reception procedure of receiving notification information from the information processing device; a reminder generation procedure of generating a reminder if it is determined that the state information satisfies one of the first condition and the second condition when the notification information is received; a notification procedure of providing a notification of the generated reminder; a state-of-charge detection procedure of detecting a state of charge in the terminal; and an application control procedure of controlling an application which operates in the terminal according to the state of charge detected in the state-of-charge detection procedure.

According to the above-described aspects (1), (7), (8), (9), and (10), it is possible to control an application such that it operates in the terminal according to the state of charge of the terminal when the terminal and the information processing device perform a condition determination of a reminder notification in a distributed manner. It is possible to reduce power consumption due to an operation of the application according to control of the operation of the application and suppress the reduction of duration of the battery in the terminal.

In the case of the above-described aspect (2), it is possible to select applications as a stop target in, for example, ascending order of priority, among applications in operation on the basis of the priorities set for the applications. Thereby, when control is performed so that the applications are stopped according to the state of charge of the terminal, it is possible to prevent usability of the terminal for the user from being lost as much as possible.

In the case of the above-described aspect (3), the number of simultaneously operable applications is set according to the state of charge of the terminal. Thereby, it is possible to prevent usability of the terminal for the user from being lost as much as possible while suppressing the reduction of the duration of the battery.

In the case of the above-described aspect (4), it is possible to perform correction according to the distance between the target position and the current position of the terminal corresponding to one condition of the reminder notification for the setting of the number of simultaneously operable applications according to the state of charge of the terminal. Thereby, it is possible to provide a reminder notification as reliably as possible by further increasing a degree of suppression of the reduction of the duration of the battery when the terminal position is closer to the target position.

In the case of the above-described aspect (5), the user can confirm the application selected as the stop target on the basis of the state of charge and perform an operation of designating whether to stop the application which is the stop target. Thereby, for example, when the user desires to prioritize the use of the application which is the stop target more than the continuation of the reminder function, the usability of the terminal is not lost because it is impossible to stop the application selected as the stop target.

In the case of the above-described aspect (6), an application which is not designated to be stopped among the applications selected as stop targets is not stopped and is continuously operated. Thereby, the user can designate an application to be stopped and an application to be continuously operated from among, for example, the applications which are stop targets. Thereby, it is possible to suppress the reduction of duration of the battery while respecting the intention of the user.

BRIEF DESCRIPTION OF THE DRAWINGS

FIG. 2 is a diagram illustrating an example of condition information to which an identifier is attached according to the first embodiment.

FIG. 3 is a diagram illustrating an example of state information to which an identifier is attached according to the first embodiment.

FIG. 4 is a diagram illustrating an example of information stored in a reminder database of an information processing device according to the first embodiment.

FIG. 13 is a diagram illustrating an example of a number-of-activatable-applications table according to the first embodiment.

FIG. 14 is a diagram illustrating an example of a stop confirmation screen according to the first embodiment.

FIG. 15 is a flowchart illustrating an example of a processing procedure to be executed by the terminal for application control according to the first embodiment.

DETAILED DESCRIPTION OF THE INVENTION

First Embodiment

First, an overview of the present embodiment will be described.

In the present embodiment, a user operates a terminal such as a smartphone to input a desired place (hereinafter referred to as target position information) and a desired time (hereinafter referred to as target time information) for which a notification of a reminder is desired to be provided. The terminal registers the input information therein and one piece of the input information, for example, the target position information, is transmitted to an information processing device such as a server. The terminal transmits the current position information acquired at each of predetermined time intervals to the information processing device after transmitting the target position information. The information processing device determines whether the current position is in a predetermined range including the target position and transmits information indicating that the terminal is located in the predetermined range if the current position is in the predetermined range. That is, the information processing device of the present embodiment performs a determination on, for example, only one piece among the input information without performing the determination on all information input into the terminal. Further, the terminal determines only whether the current time is within a predetermined time period including the target time and provides a notification of the reminder if the current time is within the predetermined time period when information indicating that the terminal is located in the predetermined range is received from the information processing device. Thus, in the present embodiment, a reminder notification process is performed by the terminal and the information processing device in a distributed manner.

Hereinafter, the embodiments of the present invention will be described with reference to the drawings.

Figure 1:
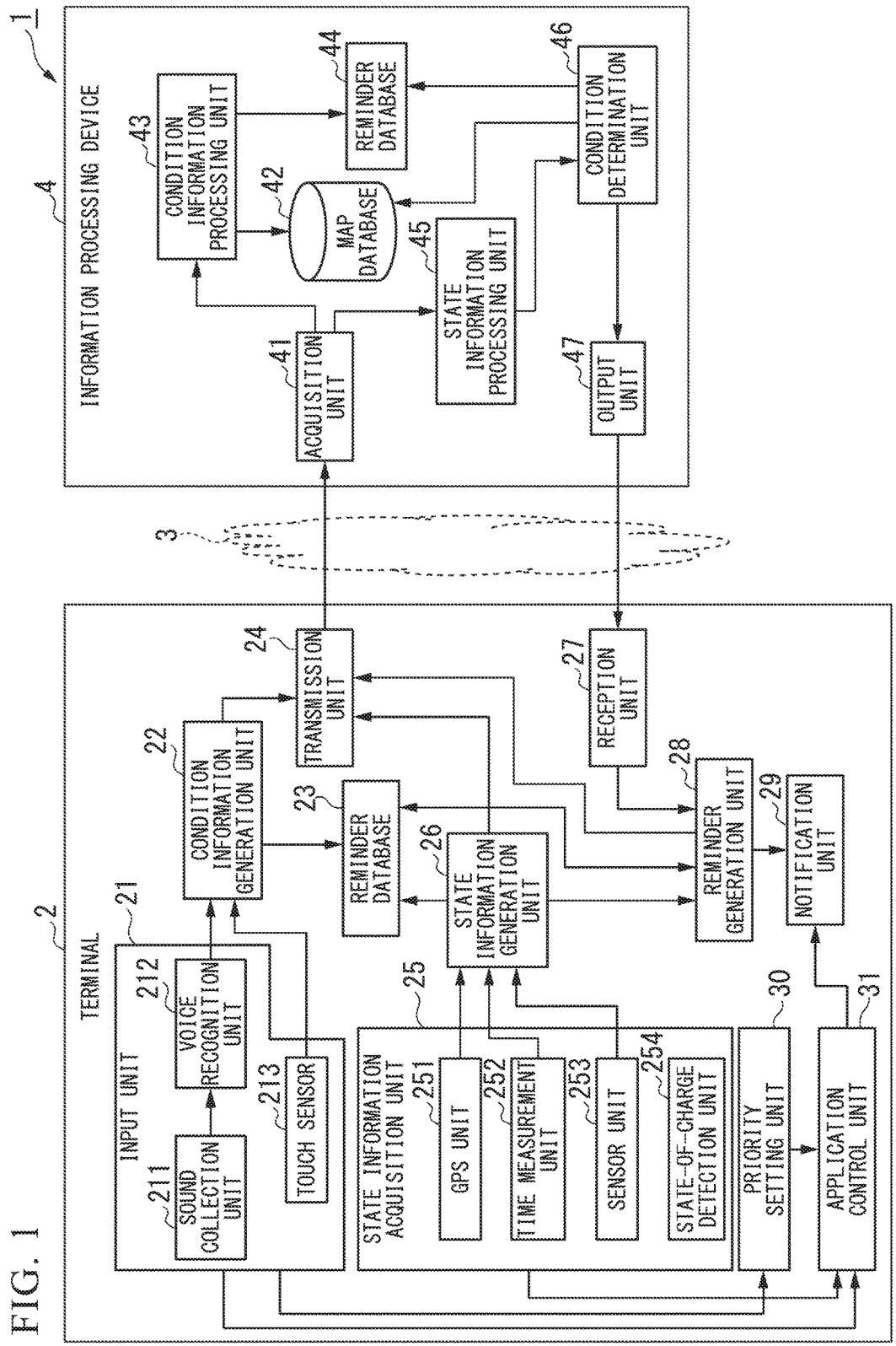
FIG. 1 is a block diagram illustrating a configuration of an information processing system according to a first embodiment.

FIG. 1 is a block diagram illustrating a configuration of an information processing system 1 according to the present embodiment. As illustrated in FIG. 1, the information processing system 1 includes a terminal 2 and an information processing device 4. The terminal 2 and the information processing device 4 exchange information via a network 3. The network 3 is, for example, the Internet using an Internet protocol (IP) as a communication protocol. Also, the network 3 may be configured to include, for example, a portable phone network, a wireless local area network (LAN), etc.

<Configuration of Terminal 2 and Configuration of Information Processing Device 4>

The terminal 2 includes an input unit 21, a condition information generation unit 22, a reminder database 23, a transmission unit 24, a state information acquisition unit 25, a state information generation unit 26, a reception unit 27, a reminder generation unit 28, a notification unit 29, a priority setting unit 30, and an application control unit 31. The input unit 21 includes a sound collection unit 211, a voice recognition unit 212, and a touch sensor 213. The state information acquisition unit 25 includes a GPS unit 251, a time measurement unit 252, and a sensor unit 253.

The information processing device 4 includes an acquisition unit 41, a map database 42, a condition information processing unit 43, a reminder database 44, a state information processing unit 45, a condition determination unit 46, and an output unit 47.

<Function of Terminal 2>

First, the terminal 2 will be described. The terminal 2 is, for example, a smartphone, a tablet terminal, a portable game device, a vehicle, a robot, or the like having a communication function. In the present embodiment, an example in which the terminal 2 is a smartphone will be described.

The input unit 21 acquires notification condition information input by the user and outputs the acquired notification condition information to the condition information generation unit 22.

The sound collection unit 211 is a microphone. The sound collection unit 211 converts the collected voice signal into an electrical signal and outputs the converted voice signal to the voice recognition unit 212.

The voice recognition unit 212 calculates a voice feature quantity of the voice signal for each frame with respect to the voice signal output by the sound collection unit 211. The voice recognition unit 212 performs a voice recognition process using the calculated voice feature quantity and a voice recognition model stored in the unit itself. The voice recognition unit 212 determines a phrase having the highest likelihood calculated using the voice recognition model with respect to the calculated voice feature quantity as a recognition result. The voice recognition unit 212 outputs text data indicating the recognition result to the condition information generation unit 22. Here, the text data includes at least target position information (a first condition) indicating a target position and target time information (a second condition) indicating a scheduled target time at which predetermined behavior is performed at the target position. Also, the target position information is at least one of, for example, information indicating landmarks such as a station name, a building name, a shop name, and a park name and a place name. Also, the target time information includes information indicating a year/month/day and a time. Also, the voice recognition unit 212 may be configured to detect a speech section on the basis of, for example, a magnitude of an acoustic signal and perform a voice recognition process on a voice signal within the detected speech section.

The touch sensor 213 is a touch panel type sensor provided on an image display unit provided in the notification unit 29. The touch sensor 213 detects a result of an operation performed by a user of the terminal 2 and outputs detected result information indicating the detected result to the condition information generation unit 22. Here, the detected result information includes at least the target position information and the target time information.

The information acquired by the sound collection unit 211 or the touch sensor 213 is a condition for allowing the user to provide a notification of a reminder. Thus, in the following description, information including at least one of the target position information and the target time information is also referred to as notification condition information.

The condition information generation unit 22 acquires the notification condition information output by the input unit 21. That is, the condition information generation unit 22 acquires the text data output by the voice recognition unit 212 or the detected result information output by the touch sensor 213. The condition information generation unit 22 generates condition information on the basis of at least one of the target position information and the target time information included in the acquired text data or detected result information. Here, the condition information is at least one of the target position information and the target time information. The condition information generation unit 22 attaches an identifier for identifying the terminal 2 to the generated condition information and outputs the condition information to the transmission unit 24, and further writes the condition information to the reminder database 23 (a storage unit). Also, in the following description, an example in which the condition information is the target position information will be described. Also, information included in the condition information is assumed to be predetermined between the terminal 2 and the information processing device 4. For example, information desired to be processed by the information processing device 4 may be configured to be predetermined by a designer of the information processing system 1. Also, the identifier is, for example, an international mobile equipment identity (IMEI), a mobile equipment identifier (MEID), or the like of the terminal 2.

The reminder database 23 stores state information in association with the condition information. Also, an example of the information stored by the reminder database 23 will be described below.

The transmission unit 24 transmits the condition information to which the identifier output by the condition information generation unit 22 is attached to the information processing device 4 via the network 3. The transmission unit 24 transmits state information to which the identifier output by the state information generation unit 26 is attached to the information processing device 4 via the network 3. Also, it is only necessary to include at least current position information in the state information to be transmitted to the information processing device 4 by the transmission unit 24. The transmission unit 24 transmits execution information to which the identifier output by the reminder generation unit 28 is attached to the information processing device 4 via the network 3.

The state information acquisition unit 25 acquires detection information to be described below and outputs the acquired detection information to the state information generation unit 26.

The GPS unit 251 receives radio waves from a GPS satellite, acquires information of a position at which the terminal 2 is used on the basis of the received radio waves, and outputs the acquired position information as current position information to the state information generation unit 26. Here, the current position information is information based on target position information and is information in which coordinates of a current position are indicated by the latitude and the longitude thereof. Also, the GPS unit 251 may acquire the position information on the basis of communication with a base station (not illustrated). Also, the GPS unit 251 may be configured to extract a GPS time included in the received radio waves, calculate the current time on the basis of the extracted GPS time, and output current time information indicating the calculated current time to the state information generation unit 26. Also, the current time information is information based on the target time information.

The time measurement unit 252 acquires the current time through communication with the base station and outputs the current time information indicating the acquired current time to the state information generation unit 26. Also, the time measurement unit 252 may be configured to perform time measurement by counting a reference clock signal generated by the terminal 2 and output the measured time information as the current time information to the state information generation unit 26.

The sensor unit 253 is a sensor which detects the state of the terminal 2 and outputs sensor information detected by the sensor to the state information generation unit 26. The sensor unit 253 is, for example, at least one sensor of an acceleration sensor which detects the tilt or the like of the terminal 2, a luminance sensor which detects the luminance around the terminal 2, a temperature sensor which detects the temperature around the terminal 2, a humidity sensor which detects the humidity around the terminal 2, an atmospheric pressure sensor which detects the atmospheric pressure around the terminal 2, etc.

A state-of-charge detection unit 254 detects a state of charge in the terminal 2. Here, the state of charge in the terminal 2 includes the following concepts.

The terminal 2 of the present embodiment includes a rechargeable battery (a storage battery) as a power supply (not illustrated). The state of charge in the terminal 2 includes a capacity of the battery, i.e., an amount of power with which the battery is charged (or stored in the battery) at present. Also, the state of charge in the terminal 2 includes whether the battery is in a charged state.

Also, the GPS unit 251, the time measurement unit 252, and the sensor unit 253 acquire information at each of predetermined time intervals. Alternatively, the GPS unit 251, the time measurement unit 252, and the sensor unit 253 may be configured to acquire at least current time information when notification information is received from the information processing device 4.

At least the current position information and the current time information among the current position information output by the GPS unit 251, the current time information output by the time measurement unit 252, and the sensor information output by the sensor unit 253 are input to the state information generation unit 26. Also, the current position information, the current time information, and the sensor information are referred to as detection information. The state information generation unit 26 generates state information using the input detection information. Here, the state information is information including at least the current position information and the current time information. The state information generation unit 26 outputs the generated state information to the reminder generation unit 28. Also, the state information generation unit 26 attaches an identifier to the state information and outputs the state information to the transmission unit 24. Also the state information generation unit 26 writes the generated state information to the reminder database 23. Also, the state information generation unit 26 may be configured to update the state information stored in the reminder database 23 and write, for example, only latest state information and immediately previous state information, to the reminder database 23.

The reception unit 27 receives the notification information transmitted by the information processing device 4 via the network 3 and outputs the received notification information to the reminder generation unit 28.

The reminder generation unit 28 determines whether the state information is input from the state information generation unit 26 within a first predetermined time period from the timing at which the reception unit 27 outputs the notification information. Here, the first predetermined time period is, for example, one minute. Also, the first predetermined time may be a value differing according to a movement speed of the terminal 2, weather, temperature, altitude, a current time, or the like. Also, the reminder generation unit 28 calculates the movement speed using, for example, first current position information at a first time and second current position information at a second time acquired from the GPS unit 251. Also, the reminder generation unit 28 may be configured to acquire information related to a weather or temperature of a current position from, for example, the Internet, via the network 3 using the reception unit 27. If it is determined that the state information has been input within a predetermined time period, the reminder generation unit 28 refers to condition information stored in the reminder database 23 and determines whether the current time is within a second predetermined time period including a target time. Alternatively, if it is determined that the state information has not been input within the predetermined time period, the reminder generation unit 28 reads the condition information and the latest state information stored in the reminder database 23 and determines whether the current time is within the second predetermined time period including the target time. Here the second predetermined time period is, for example, 5 minutes.

If the current time is within the second predetermined time period including the target time, the reminder generation unit 28 generates a reminder when determining that the current position is in the predetermined range including the target position and the current time is within the second predetermined time period including the target time. The reminder generation unit 28 outputs the generated reminder to the notification unit 29. Further, when the reminder is output to the notification unit 29, the reminder generation unit 28 attaches an identifier and target time information to execution information indicating that the reminder has been executed and outputs the execution information to the transmission unit 24.

The notification unit 29 provides a notification of the reminder output by the reminder generation unit 28 using at least one of an image, voice, vibration, etc. The notification unit 29 is configured to include an image display device, a voice output device, a vibration device, etc. The image display device is, for example, a liquid crystal display, the voice output device is, for example, a speaker, and the vibration device is, for example, a vibrator.

The priority setting unit 30 sets a priority for each application installed in the terminal 2. The priority setting unit 30 of the present embodiment sets a priority level for an application as the priority. Also, the priority setting unit 30 may set a numerical value indicating a degree of priority for each application in place of the priority level.

As will be described below, the user can set the priority level by operating a priority level setting screen displayed on the image display unit provided in the notification unit 29.

The application control unit 31 controls applications to be simultaneously operated in the terminal 2 according to the state of charge detected by the state-of-charge detection unit 254. Specifically, the application control unit 31 can perform control so that an operation of an application selected as a stop target from among the applications to be simultaneously operated in the terminal 2 is stopped.

<Function of Information Processing Device 4>

Next, the information processing device 4 will be described. The information processing device 4 is, for example, a server.

The acquisition unit 41 is a reception unit and receives the condition information, the state information, or the execution information transmitted by the terminal 2 via the network 3. The acquisition unit 41 outputs the received condition information, state information, or execution information to the condition information processing unit 43 and the state information processing unit 45.

The map database 42 stores attribute information for each landmark in association with information for identifying the reminder. Here, the information for identifying the reminder is, for example, a station name of a railroad or the like, a building name, a park name, a square name, a facility name, a nickname or the like. Also, the attribute information of the landmark includes, for example, coordinates (latitude and longitude) of the landmark and an address of the landmark. The map database 42 may be configured to further store, for example, information of a premises diagram of a station of a railroad or the like and information of a premises diagram of a site constituted of a plurality of buildings (e.g., premises of a university). Also, the information processing device 4 may not include the map database 42 and the map database 42 may be connected to the information processing device 4 via the network 3.

The condition information processing unit 43 extracts condition information from the information output by the acquisition unit 41 and converts target position information included in the extracted condition information into coordinates (latitude and longitude) by referring to the map database 42. The condition information processing unit 43 writes the coordinates obtained through the conversion to the reminder database 44 in association with an identifier. Also, the condition information processing unit 43 may also be configured to write the target time information to the reminder database 44 in association with the above-described information if the target time information is included in the condition information.

The reminder database 44 associates and stores coordinates of a target position and a target date and time for each identifier. Also, an example of information stored by the reminder database 44 will be described below.

The state information processing unit 45 extracts the state information from the information output by the acquisition unit 41 and outputs the current position information included in the extracted state information to the condition determination unit 46. Also, the state information processing unit 45 extracts the execution information from the information output by the acquisition unit 41 and outputs the extracted execution information to the condition determination unit 46.

When the state information has been input from the state information processing unit 45, the condition determination unit 46 determines whether the current position information included in the state information is in a predetermined range with coordinates of a target position associated with the identifier as a center by referring to the reminder database 44. Also, the predetermined range will be described below.

If it is determined that the current position is in the predetermined range, the condition determination unit 46 generates notification information indicating that the terminal 2 is located in the predetermined range and outputs the generated notification information to the output unit 47.

Also, when the execution information has been input from the state information processing unit 45, the condition determination unit 46 deletes the coordinates of the target position and the target time information associated with the identifier included in the execution information from the reminder database 44. Also, if coordinates of a plurality of target positions and target time information are associated and stored in the reminder database 44 for one identifier, the condition determination unit 46 deletes the coordinates of the target position and the target time information coincident with the target time information included in the execution information from the reminder database 44.

The output unit 47 is a transmission unit and the notification information output by the condition determination unit 46 is transmitted to the terminal 2 via the network 3.

Here, an example of condition information, an example of state information, and an example of information stored in the reminder database 44 will be described.

First, an example of the condition information will be described.

FIG. 2 is a diagram illustrating an example of condition information to which an identifier is attached according to the present embodiment. In the example illustrated in FIG. 2, for information to be transmitted to the information processing device 4, target position information and target time information are associated with the identifier.

Next, the example of the state information will be described.

FIG. 3 is a diagram illustrating an example of state information to which an identifier is attached according to the present embodiment. As illustrated in FIG. 3, for information to be transmitted to the information processing device 4, current position information, current time information, and sensor information are associated with the identifier.

Next, an example of information stored in the reminder database 44 will be described.

FIG. 4 is a diagram illustrating an example of information stored in the reminder database 44 of the information processing device 4 according to the present embodiment. Also, an example illustrated in FIG. 4 is an example in which the target position information and the target time information are included in the condition information. In the example illustrated in FIG. 4, for example, coordinates of AA building of Shibuya and "17:00 on Jul. 7, 2015" as the target time information are associated with the identifier ID1001

<Display Image Example of Terminal 2>

Next, an example of the display image displayed on the image display unit provided in the notification unit 29 of the terminal 2 will be described.

Figure 5:
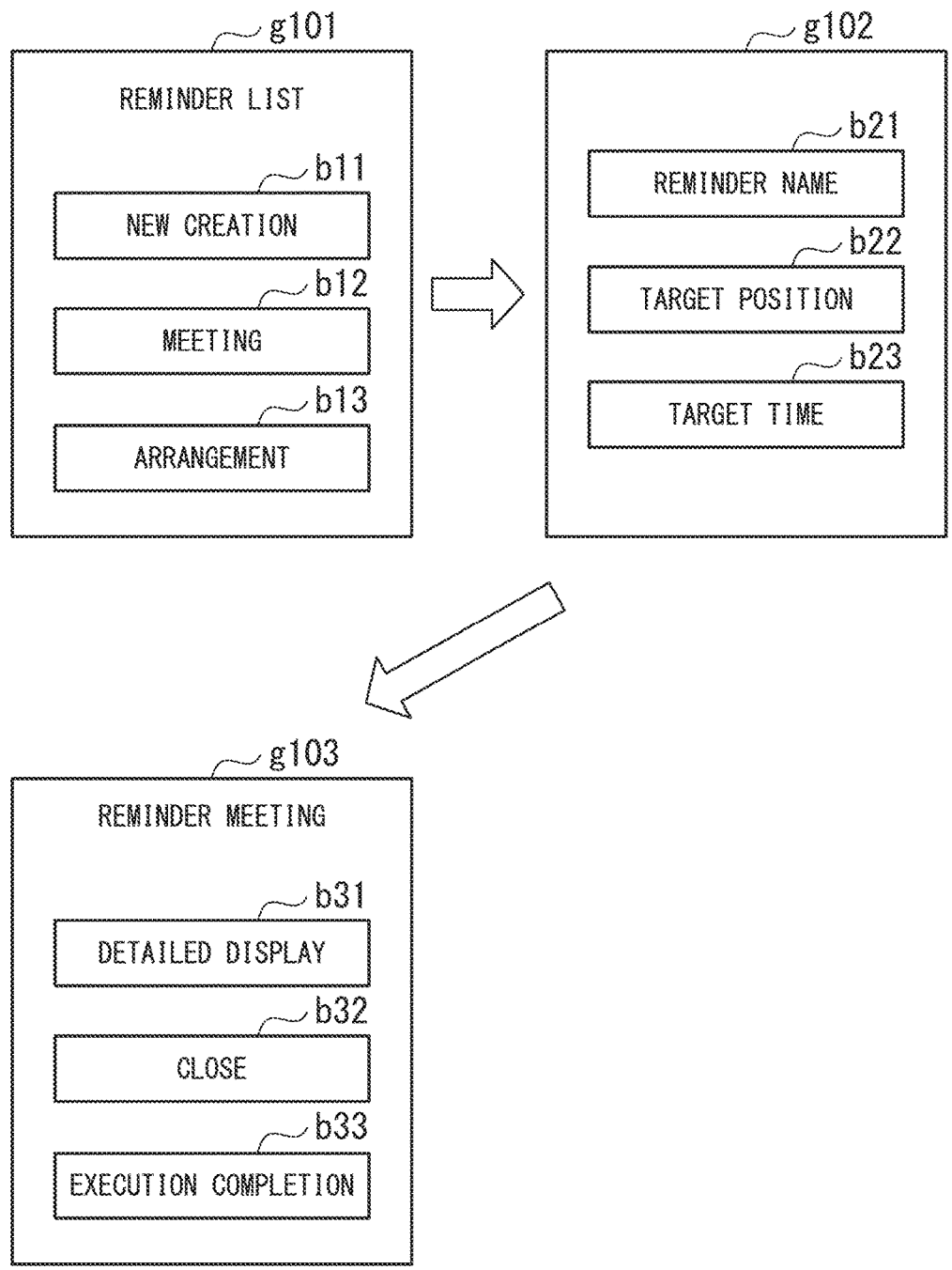
FIG. 5 is a diagram illustrating an example of a display image displayed on an image display unit provided in a notification unit of a terminal according to the first embodiment.

FIG. 5 is a diagram illustrating an example of a display image displayed on an image display unit provided in the notification unit 29 of the terminal 2 according to the present embodiment. An image indicated by reference numeral g101 of FIG. 5 is an example of a display image when notification condition information is registered. The display image includes an image b11 of a new creation button, an image b12 indicating a registered "meeting," and an image b13 indicating a registered "arrangement." When new notification condition information is registered, the user selects the image b11 of the new creation button. A selection result is detected by the touch sensor 213. Also, if the registered notification information is referred to or edited, the user selects, for example, the image b12 indicating the "meeting."

An image indicated by reference numeral g102 of FIG. 5 is an example of a display image when the image b11 of the new creation button is selected. The display image includes an image b21 of a button for editing a reminder name, an image b22 of a button for inputting a target position, and an image b23 of a button for inputting a target time. The user selects the image b21 of the button for editing the reminder name and selects or inputs a reminder name, for example, "shopping." The user selects the image b22 of the button for inputting the target position and inputs information related to the target position for registering a reminder, for example, a place name and a landmark name. The user selects the image b23 of the button for inputting the target time and selects or inputs a year/month and a time for registering the reminder.

An image indicated by reference numeral g103 of FIG. 5 is an example of a display image at the time of a notification of the reminder.

The display image includes an image b31 of a button for displaying details of the reminder, an image b32 of a button for closing a notification image of the reminder, and an image b33 of a button for confirming that the reminder has been executed. If the user desires to confirm detailed content of the registered reminder when a notification of the reminder is provided, the image b31 of the button for displaying the details of the reminder is selected. Thereby, information of the registered reminder name, target position, and target time is displayed. Also, if the user desires to iterate the notification after the notification of the reminder, the image b32 of the button for closing the notification image of the reminder is selected. Thereby, a condition registered by the terminal 2 and the information processing device 4 is checked again after, for example, 5 minutes, and the terminal 2 provides the notification of the reminder again if the condition is satisfied. Also, if the user desires to end the notification of the reminder after the notification of the reminder, the image b33 of the button for confirming that the reminder has been executed is selected. Thereby, the terminal 2 does not provide the notification related to the reminder thereafter.

Also, an example in which the user operates the touch sensor 213 to register notification condition information and a notification is provided from the image display unit provided in the notification unit 29 has been described in the example illustrated in FIG. 5, but the present invention is not limited thereto. The registration of the notification condition information may be performed by voice. Also, the notification unit 29 may be configured to provide the notification using voice or vibration. The user may select a type of notification by operating, for example, the touch sensor 213 or by voice.

<Example of Range of Position at which Information Processing Device 4 Detects Terminal 2>

Figure 6:
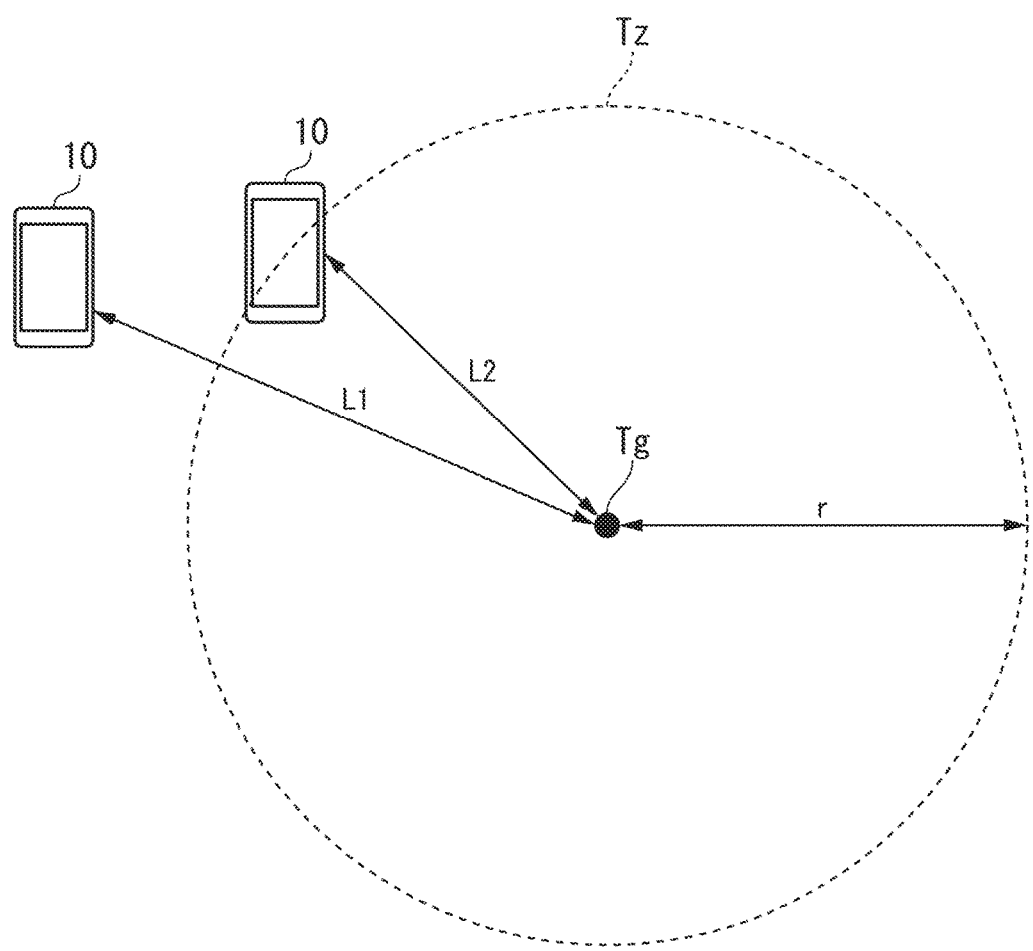
FIG. 6 is a diagram illustrating an example of a range of a position at which the information processing device detects the terminal according to the first embodiment.

Next, an example of a range of a position at which the information processing device 4 detects the terminal 2 will be described. FIG. 6 is a diagram illustrating an example of a range of a position at which the information processing device 4 detects the terminal 2 according to the present embodiment. In FIG. 6, reference numeral Tg indicates a target position. Also, a range indicated by a circle Tz of a dashed line is the above-described predetermined range. As illustrated in FIG. 6, the predetermined range is a range of a circle having a radius r with the target position Tg as a center. Also, a shape of a range illustrated in FIG. 6 is an example and the shape of the range is not limited to a circle and may be an ellipse, a rectangle, a polygon, a shape of station premises, or the like.

The information processing device 4 determines that the position of the terminal 2 is not in the predetermined range because a distance L1 is greater than the radius r in the case of the distance L1 from the target position Tg. Also, the information processing device 4 determines that the position of the terminal 2 is in the predetermined range because a distance L2 is less than the radius r in the case of the distance L2 (<L1) from the target position Tg.

<Example of Predetermined Time Interval at which Terminal 2 Acquires and Transmits Information>

Figure 7:
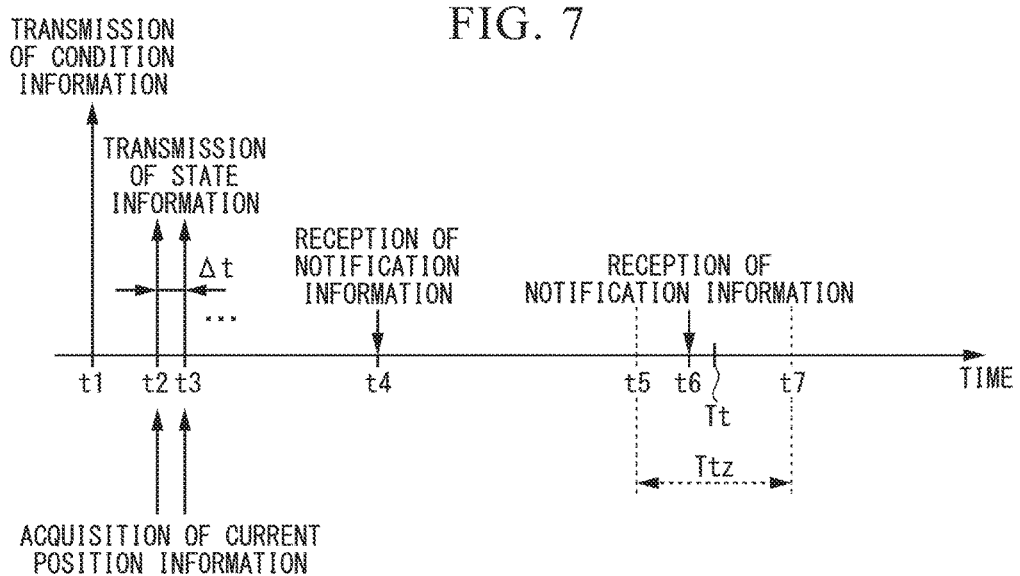
FIG. 7 is a diagram illustrating an example of a predetermined time interval at which the terminal acquires and transmits information according to the first embodiment.

Next, an example of a predetermined time interval at which the terminal 2 acquires and transmits information will be described. FIG. 7 is a diagram illustrating an example of a predetermined time interval at which the terminal 2 acquires and transmits information according to the present embodiment. In FIG. 7, the horizontal axis represents time. Also, time Tt is a target time and a time period Ttz of times t5 to t7 is a second predetermined time period. As illustrated in FIG. 7, the target time Tt is included in the second predetermined time period Ttz.

After the notification condition information is input by the user, the terminal 2 generates condition information using the target position information and the target time information included in the input notification condition information and transmits the generated condition information to the information processing device 4 at a time t1.

At the timings of times t2, t3, . . . with a predetermined time interval Δt, the terminal 2 acquires information of a current position at which the terminal 2 is used and transmits state information generated on the basis of the acquired current position information to the information processing device 4.

At a time t4, the user is assumed to have moved in a predetermined range of the registered target position. Also, the time t4 is a time which is not included in the second predetermined time period Ttz. Thereby, because the terminal 2 is located in the predetermined range at the time t4, the information processing device 4 transmits notification information to the terminal 2. The terminal 2 receives notification information at the time t4. The terminal 2 determines that the time t4 is a time which is not included in the predetermined time period Ttz and does not provide a notification of the reminder.

At a time t6, the user assumes to have moved in the predetermined range of the registered target position. Also, the time t6 is a time included in the second predetermined time period Ttz. Thereby, the information processing device 4 transmits the notification information to the terminal 2 because the terminal 2 is located in the predetermined range at the time t6. The terminal 2 receives the notification information at the time t6. The terminal 2 determines that the time t6 is a time included in the predetermined time period Ttz and provides the notification of the reminder.

<Example of Processing Procedure of Terminal 2>

Figure 8:
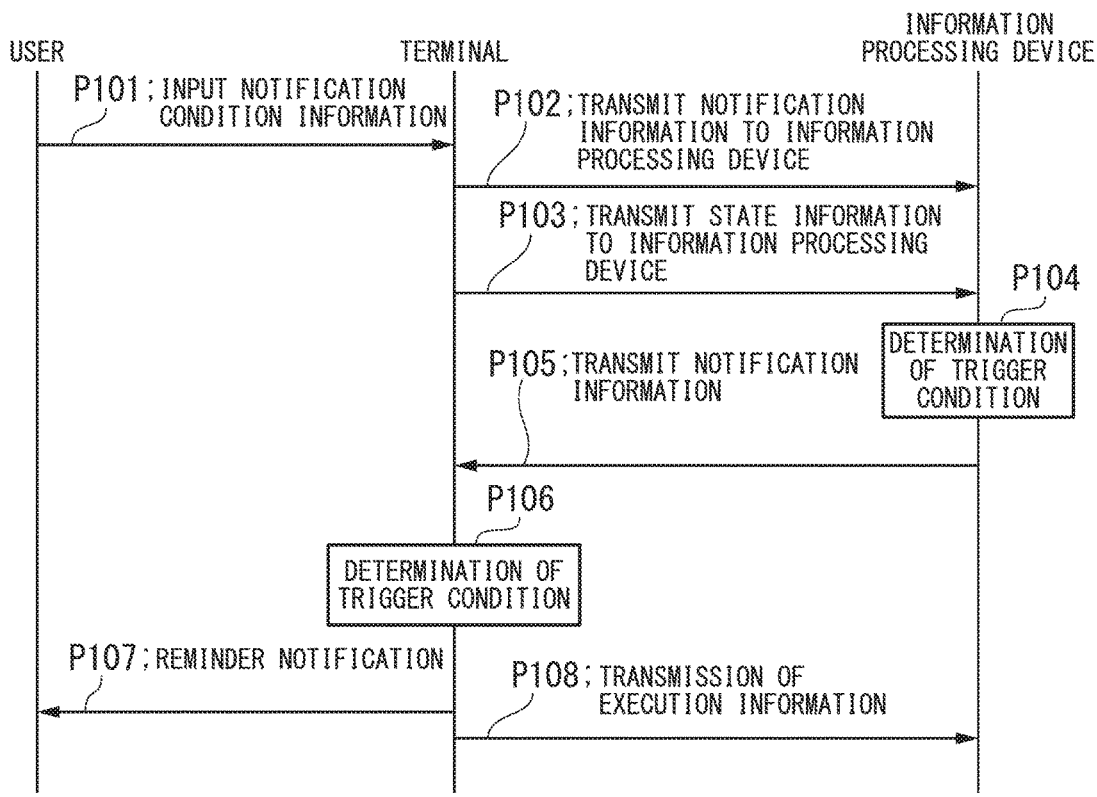
FIG. 8 is a sequence diagram illustrating an example of a processing procedure of the terminal and the information processing device according to the first embodiment.
Figure 9:
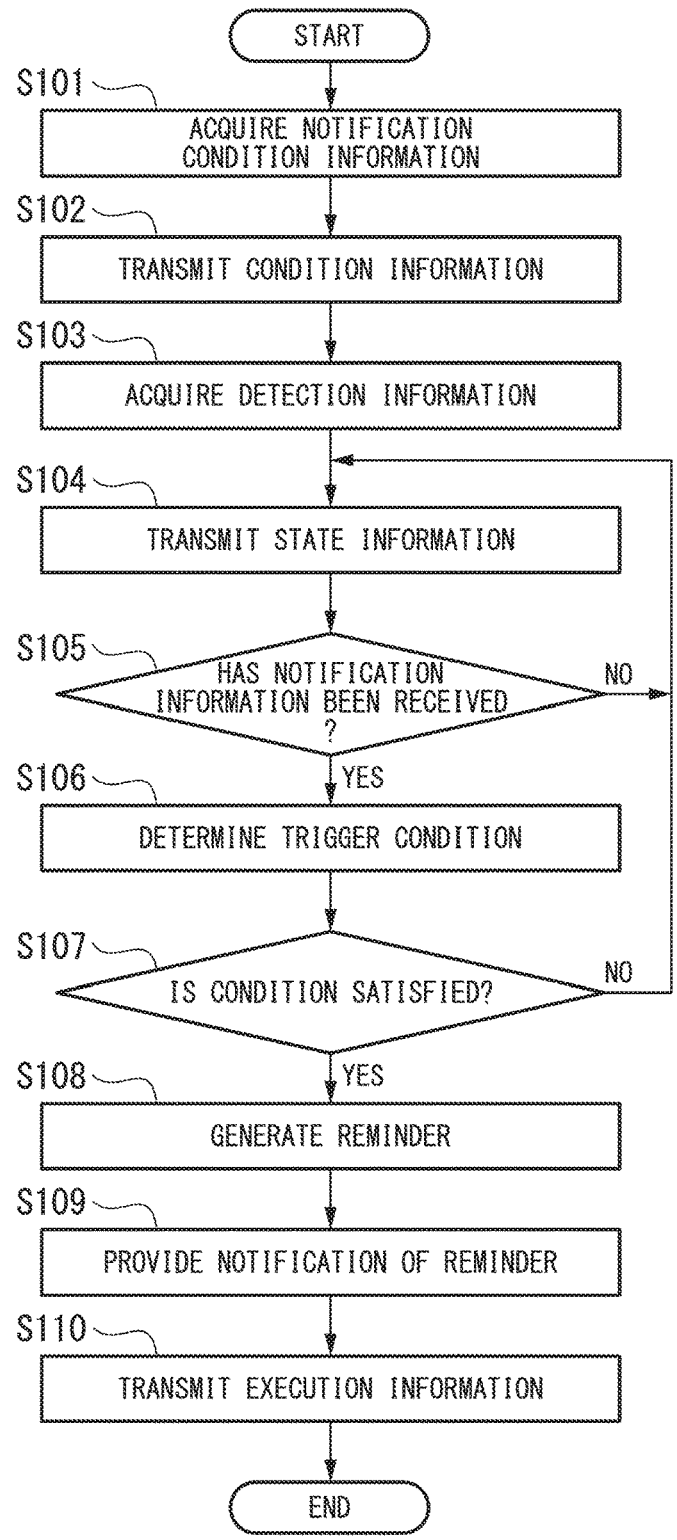
FIG. 9 is a flowchart illustrating an example of a processing procedure of the terminal according to the first embodiment.

Next, an example of a processing procedure of the terminal 2 will be described using FIG. 9 with reference to FIG. 8. FIG. 8 is a sequence diagram illustrating an example of a processing procedure of the terminal 2 and the information processing device 4 according to the present embodiment. FIG. 9 is a flowchart illustrating an example of a processing procedure of the terminal 2 according to the present embodiment.

First, the user operates the terminal 2 to input notification condition information including a target position and a target time (FIG. 8, P101).

(Step S101) The input unit 21 acquires the input notification condition information.

(Step S102) The condition information generation unit 22 generates the condition information on the basis of the acquired notification condition information and the transmission unit 24 transmits the condition information to which the identifier is attached to the information processing device 4 (FIG. 8, P102). Subsequently, the condition information generation unit 22 writes the generated condition information to the reminder database 23.

(Step S103) The state information acquisition unit 25 acquires detection information.

(Step S104) The state information generation unit 26 generates state information according to the condition information using the acquired detection information. Also, if the condition information is target position information, the state information according to the condition information is current position information. Subsequently, the state information generation unit 26 transmits the state information to which the identifier is attached to the information processing device 4 through the transmission unit 24 (FIG. 8, P103). Also, the state information generation unit 26 may transmit the condition information along with the state information to the information processing device 4 through the transmission unit 24. Subsequently, the state information generation unit 26 outputs the generated state information to the reminder generation unit 28.

(Step S105) The reception unit 27 determines whether the notification information has been received. The process proceeds to the process of step S106 when the reception unit 27 determines that the notification information has been received (step S105; YES) and the process returns to the process of step S104 when the reception unit 27 determines that the notification information has not been received (step S105; NO).

(Step S106) The reminder generation unit 28 determines whether a trigger condition is satisfied (FIG. 8, P106). Also, the trigger condition is whether the state information has been input from the state information generation unit 26 to the reminder generation unit 28 within the first predetermined time period from the timing at which the reception unit 27 has output the notification information.

(Step S107) The process proceeds to the process of step S108 if the reminder generation unit 28 determines that the trigger condition is satisfied (step S107; YES) and the process returns to the process of step S104 if the reminder generation unit 28 determines that the trigger condition is not satisfied (step S107; NO).

(Step S108) The reminder generation unit 28 generates a reminder when determining that the current position is in the predetermined range including the target position and the current time is within the second predetermined time period including the target time.

(Step S109) The notification unit 29 provides a notification of the reminder output by the reminder generation unit 28 using at least one of an image, voice, vibration, etc. (FIG. 8, P107)

(Step S110) When the reminder has been output to the notification unit 29, the reminder generation unit 28 transmits execution information to which an identifier and target time information are attached to the information processing device 4 through the transmission unit 24 (FIG. 8, P108).

Thus, the process of the terminal 2 ends.

<Example of Processing Procedure of Information Processing Device 4>

Figure 10:
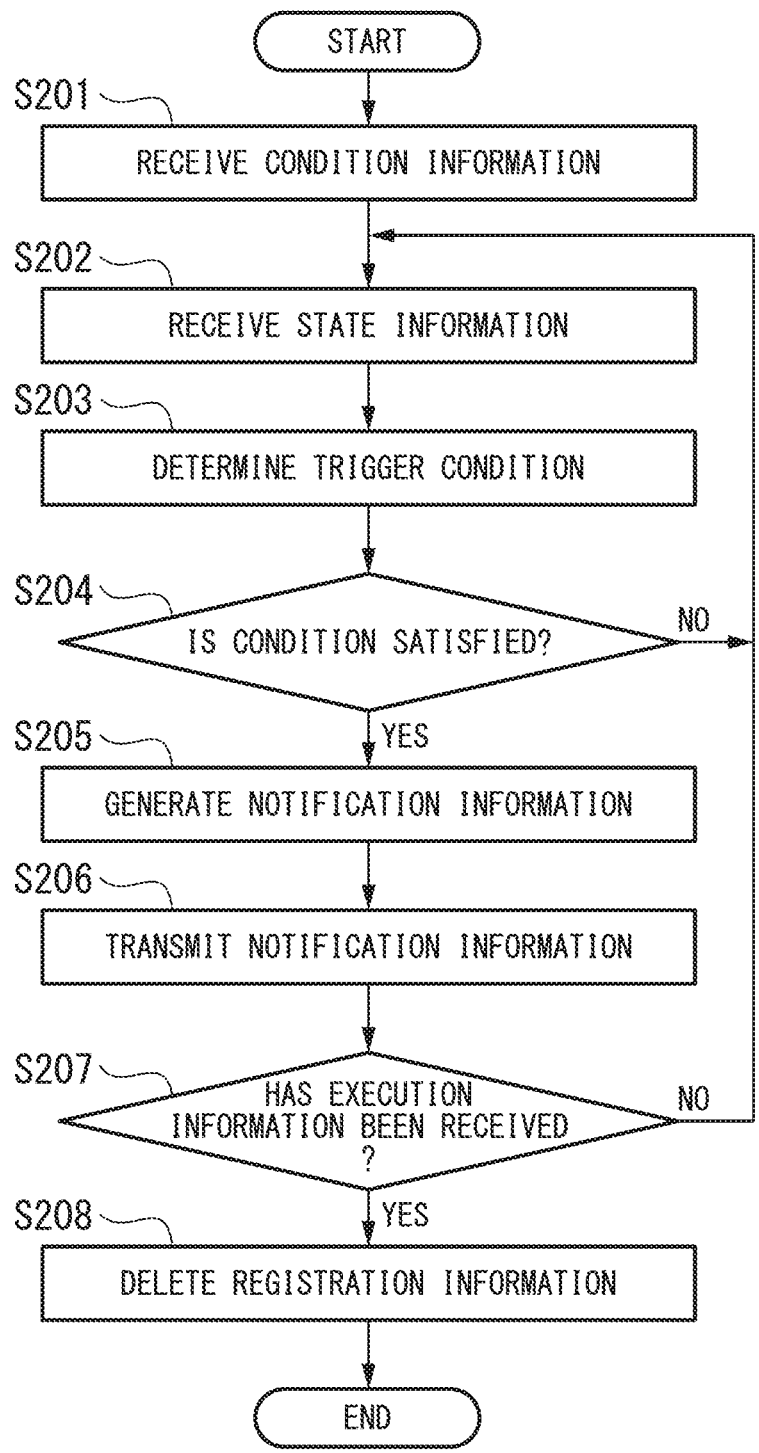
FIG. 10 is a flowchart illustrating an example of a processing procedure of the information processing device according to the first embodiment.

Next, an example of a processing procedure of the information processing device 4 will be described using FIG. 10 with reference to FIG. 8. FIG. 10 is a flowchart illustrating an example of a processing procedure of the information processing device 4 according to the present embodiment.

(Step S201) The acquisition unit 41 receives condition information transmitted by the terminal 2.

(Step S202) The acquisition unit 41 receives state information transmitted by the terminal 2.

(Step S203) When the state information has been input from the state information processing unit 45, the condition determination unit 46 determines whether a trigger condition is satisfied by referring to the reminder database 44 (FIG. 8, P104). Also, the trigger condition is whether the current position information included in the state information is in a predetermined range with coordinates of a target position associated with an identifier as a center.

(Step S204) The process proceeds to the process of step S205 if the condition determination unit 46 determines that the trigger condition is satisfied (step S204; YES) and the process returns to the process of step S202 if the condition determination unit 46 determines that the trigger condition is not satisfied (step S204; NO).

(Step S205) The condition determination unit 46 generates notification information indicating that the terminal 2 is located in a predetermined range if it is determined that the current position is in the predetermined range.

(Step S206) The condition determination unit 46 transmits the generated notification information to the terminal 2 through the output unit 47 (FIG. 8, P105).

(Step S207) The condition determination unit 46 determines whether execution information has been received from the state information processing unit 45. The process proceeds to the process of step S208 if the condition determination unit 46 determines that the execution information has been received (step S207; YES) and the process returns to the process of step S202 if the condition determination unit 46 determines that the execution information has not been received (step S207; NO).

(Step S208) The condition determination unit 46 deletes the coordinates of the target position and the target time information associated with the identifier included in the execution information from the reminder database 44.

Thus, the process of the information processing device 4 ends.

<Specific Example of Process of Information Processing System 1>

Here, a specific example of a process to be performed by the information processing system 1 will be described with reference to FIG. 8 or the like.

The user operates the touch sensor 213 of the terminal 2 in, for example, the display image indicated by reference numeral g101 or g102 of FIG. 5, to input notification condition information "meeting at AA building of Shibuya at 17:00 (target time) on Jul. 7, 2015 (FIG. 8, P101)."

Next, the terminal 2 transmits at least target position information among the input notification condition information as condition information to the information processing device 4 (FIG. 8, P102). As described above, an identifier is attached to the condition information to be transmitted. Next, the information processing device 4 writes the received condition information to the reminder database 44.

Next, the terminal 2 acquires the current position information and the current time information for each predetermined time interval and transmits the current position information as the condition information to the information processing device 4 (FIG. 8, P103). As described above, an identifier is attached to the state information to be transmitted. Next, the information processing device 4 writes the received state information to the reminder database 44.

Next, the information processing device 4 determines the trigger condition according to whether the current position at which the terminal 2 is used is in the predetermined range including the target position (FIG. 8, P104).

Next, the information processing device 4 generates notification information and transmits the generated notification information to the terminal 2 if it is determined that the current position at which the terminal 2 is used is in the predetermined range including the target position (FIG. 8, P105).

Next, when the notification information has been received, the terminal 2 determines the trigger condition according to whether the current time is in the second predetermined time period including the target time (FIG. 8, P106).

Next, if the current time is in the second predetermined time period including the target time, the terminal 2 generates a reminder and notifies the notification unit 29 of the generated reminder using an image as in the display image of reference numeral g103 of FIG. 5 (FIG. 8, P107).

Next, the terminal 2 transmits notification information to the information processing device 4 because the notification of the reminder from the notification unit 29 has been executed (FIG. 8, P108). Also, as described above, an identifier is attached to the execution information to be transmitted. Next, the information processing device 4 deletes the coordinates of the target position and the target time information associated with the identifier included in the execution information from the reminder database 44.

As described above, in the present embodiment, the information processing device 4 determines a trigger condition only for a position of the terminal 2, for example, as illustrated in FIG. 6, and the terminal 2 determines a trigger condition only for a time according to notification information transmitted from the information processing device 4. Thereby, in the present embodiment, the information processing device 4 does not perform all of the reminder notification process as in the conventional technology and can perform the process in a distributed manner with the terminal 2. As a result, according to the present embodiment, it is possible to reduce the load on the information processing device 4 in the information processing system which provides a notification of a reminder. Also, unlike a case in which only the terminal 2 determines the trigger condition in terms of a position and time according to an application for providing a reminder notification installed in the terminal 2, it is possible to reduce the load on the terminal 2 and reduce the power consumption of the terminal 2.

Also, an example in which the terminal 2 transmits only the target position information as the condition information to the information processing device 4 has been described in the above-described example, but the present invention is not limited thereto. The terminal 2 may be configured to transmit only the target time information as the condition information or may be configured to transmit both the target position information and the target time information as the condition information. Also, the condition information to be transmitted from the terminal 2 to the information processing device 4 is predetermined. Alternatively, if the number of pieces of information included in the condition information received from the terminal 2 is one, the information processing device 4 may be configured to determine whether the included information is the target position information or the target time information. Therefore, the information processing device may be configured to perform a process of generating the notification information according to the received condition information.

Also, the terminal 2 may be configured to transmit only the current time information as the state information or may be configured to transmit all of the current position information, the current time information, and the sensor information as the state information. Also, the state information to be transmitted from the terminal 2 to the information processing device 4 is predetermined.

Also, if the number of identifiers indicating terminals 2 for which notification condition information is registered is two or more, the information processing device 4 performs the above-described process for each terminal 2. For example, if the number of identifiers for which target positions Tg are registered is 100, the information processing device 4 determines whether each of the 100 terminals is in a predetermined range. If it is determined that 10 terminals 2 among the 100 terminals 2 are in the predetermined range, the information processing device 4 transmits notification information to the terminals 2 corresponding to 10 identifiers. Thus, the information processing device 4 determines only whether the terminal 2 is in the predetermined range and does not determine whether a time at which the terminal 2 is in the predetermined range is within a second predetermined time period. Thus, it is possible to reduce the load on the information processing device 4 in the present embodiment compared with in the conventional technology when the number of terminals 2 using the present system increases.

According to this process, in the present embodiment, the terminal 2 transmits the condition information to be processed by the information processing device 4 and receives the notification information which is a determination result of the trigger condition transmitted by the information processing device 4. When the notification information has been received, the terminal 2 can determine the trigger condition by comparing the current time information acquired by the own terminal 2 with the target time information. Thus, according to the present embodiment, it is possible to reduce the load on each of the terminal 2 and the information processing device 4 because the reminder notification process can be performed by the terminal 2 and the information processing device 4 in a distributed manner.

<Application Control in Terminal>

The terminal 2 including a reminder notification function of the present embodiment is, for example, a smartphone, i.e., a portable type, and it is usual to generally drive the terminal 2 with a rechargeable battery. Thus, it is preferable to lengthen duration of the battery as much as possible. However, because a part of the reminder notification process is imposed on the terminal 2 and the power consumption thereof increases in the case of the present embodiment, this becomes a factor which shortens the duration of the battery. According to this viewpoint, it is preferable to reduce the power consumption of the terminal 2 on which the part of the reminder notification process is imposed.

In the smartphone, a plurality of applications are simultaneously activated and are in operation in many cases. The power consumption of the smartphone increases when the number of applications in operation simultaneously increases. Here, the plurality of applications which operate in the smartphone are not always required by the user at that time, and an application may be included for which there is no special impediment for the user even when the application is stopped (ended).

Therefore, in the present embodiment, an application which operates in the terminal 2 is controlled according to a state of charge of the battery.

Specifically, the terminal 2 sets the number of simultaneously operable applications (hereinafter referred to as the "number of activatable applications") so that the number is reduced step by step when a capacity (a remaining capacity) of the battery is reduced. If the number of simultaneously operating applications is greater than the number of activatable applications, an application selected from among simultaneously operating applications is stopped so that the number of simultaneously operating applications is less than or equal to the number of activatable applications.

If the applications are controlled as described above, the terminal 2 limits the maximum number of applications which operate simultaneously according to a decrease in the capacity of the battery. When the maximum number of applications is limited, the power consumption is also reduced. As a result, it is possible to suppress the reduction of duration of the battery when a part of the process related to the condition determination related to the reminder notification is imposed on the terminal 2.

In addition, in the present embodiment, a priority level (an example of priority) of an application preset by the user is used when an application which is a stop target is selected so that the number of simultaneously operating applications is less than or equal to the number of activatable applications. The user can set priority levels of applications installed in the terminal 2 according to an operation on the terminal 2.

The terminal 2 uses the priority level as follows when the application which is the stop target is selected so that the number of simultaneously operating applications is less than or equal to the number of activatable applications. That is, the terminal 2 first excludes applications equal in number to activatable applications among applications currently being operated from the stop targets in descending order of a priority level and designates the remaining applications as the stop targets.

Thus, it is difficult to select an application having high necessity for the user as a stop target when performing the selection of an application.

However, even when the application which is the stop target is selected according to the priority level as described above, the application selected as the stop target may be used and desired to be unstopped according to a state of the user at that time.

Therefore, the terminal 2 does not immediately stop the applications if the applications which are the stop targets are determined, presents the applications which are the stop targets to the user, and displays a stop confirmation screen for confirming whether they should be stopped.

The user viewing the stop confirmation screen can perform an operation of designating the approval or rejection of stopping of the applications presented as the stop targets. The terminal 2 stops an application for which stopping is approved and continues an operation of an application for which stopping is rejected without stopping the application. In the present embodiment as described above, consideration is given so that the use of the terminal 2 by the user does not become inconvenient by taking into account the intention of the user when an application is stopped.

Also, control related to the application stopping according to the state of charge performed by the terminal 2 as described above is referred to as "application control" in the following.

Hereinafter, a configuration example for implementing the above-described application control of the present embodiment will be described.

As described above, when the terminal 2 of the present embodiment performs the application control, priority levels among the applications installed in the terminal 2 are preset according to an operation of the user.

The notification of the reminder of the present embodiment is implemented according to, for example, an operation of a reminder application installed in the terminal 2. The user sets the priority level of the application according to an operation on the reminder application. Also, in the following description, an example of an operation when the image display unit provided in the notification unit 29 is configured as a touch panel in combination with the touch sensor 213 is given.

When the priority levels among the applications are set, the user causes a priority level setting screen to be displayed by activating the reminder application and performing a predetermined operation on a screen of the reminder application.

Figure 11:
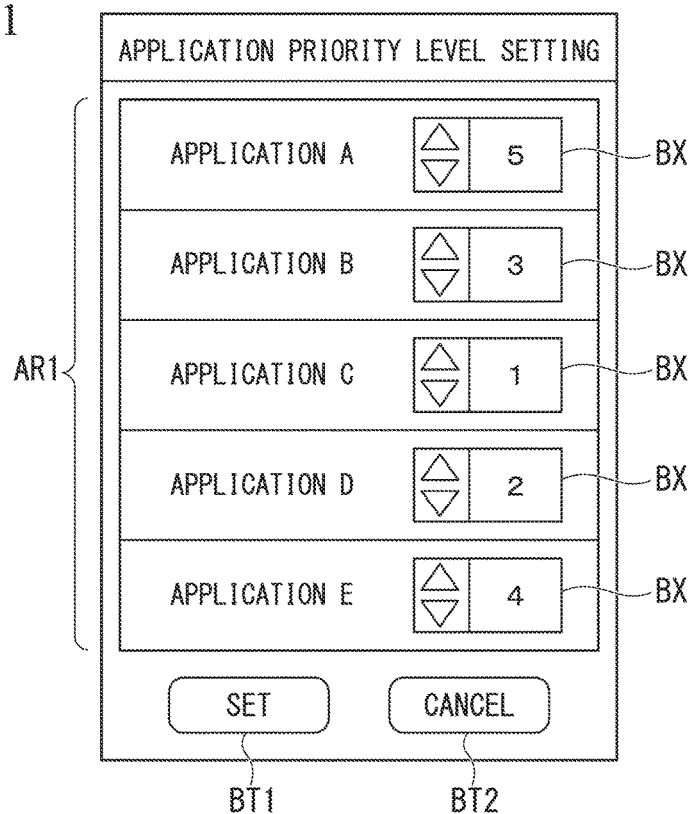
FIG. 11 is a diagram illustrating an example of a priority level setting screen according to the first embodiment.

FIG. 11 illustrates an example of the priority level setting screen. In the priority level setting screen of FIG. 11, an application list area AR1 is arranged. In the application list area AR1, a list of applications installed in the terminal 2 is shown.

In the application list area AR1 of FIG. 11, list items for five applications from application A to application E are displayed.

Also, if the number of installed applications is five or more, it is only necessary to display list items of other applications as follows. That is, for example, it is only necessary to display the list items of the other applications according to a scroll operation for the application list area AR1. Alternatively, the list items of the other applications may be displayed according to an operation of turning or returning a page by designating the application list area AR1 as a page structure.

Also, when the number of installed applications is quite large, it is very troublesome to set priority levels for all applications. Therefore, for example, the terminal 2 may be configured to, after storing a use history of applications for a fixed previous period, display a predetermined number of higher-order applications having a high use frequency on the basis of the usage history on the application list area AR1 as a priority level setting target.

Also, in the application list area AR1, a priority level input box BX is arranged for each list item. The user inputs a numerical value indicating a priority level desired to be set for a corresponding application to the priority level input box BX. Also, an input of the numerical value indicating the priority level can be performed according to a touch operation on an up button and a down button arranged in the priority level input box BX. Alternatively, the numerical value input indicating a priority level may be performed according to an operation of inputting text serving as a number using a text input system.

The user performs the touch operation on a set button BT1 if the priority levels among the applications are input according to an operation on the application list area AR1 as described above.

According to the touch operation on the set button BT1, the priority levels among the applications are set (updated)

so that an input result for the application list area AR1 is taken into account and the priority level setting screen is deleted.

Also, if the touch operation has been performed on a cancel button BT2, the priority level setting screen is deleted without setting input results for the application list area AR1 as the priority levels.

If the priority level setting screen is deleted, the screen returns to, for example, a main screen of the reminder application.

A part which performs the application control in the terminal 2 of the present embodiment is an application control unit 31. The application control unit 31 first acquires the capacity of the battery serving as the state of charge of the battery at the time of the application control. The application control unit 31 determines the number of applications capable of being simultaneously activated (the number of activatable applications) on the basis of the acquired capacity of the battery. Hereinafter, this point will be described.

Figure 12:
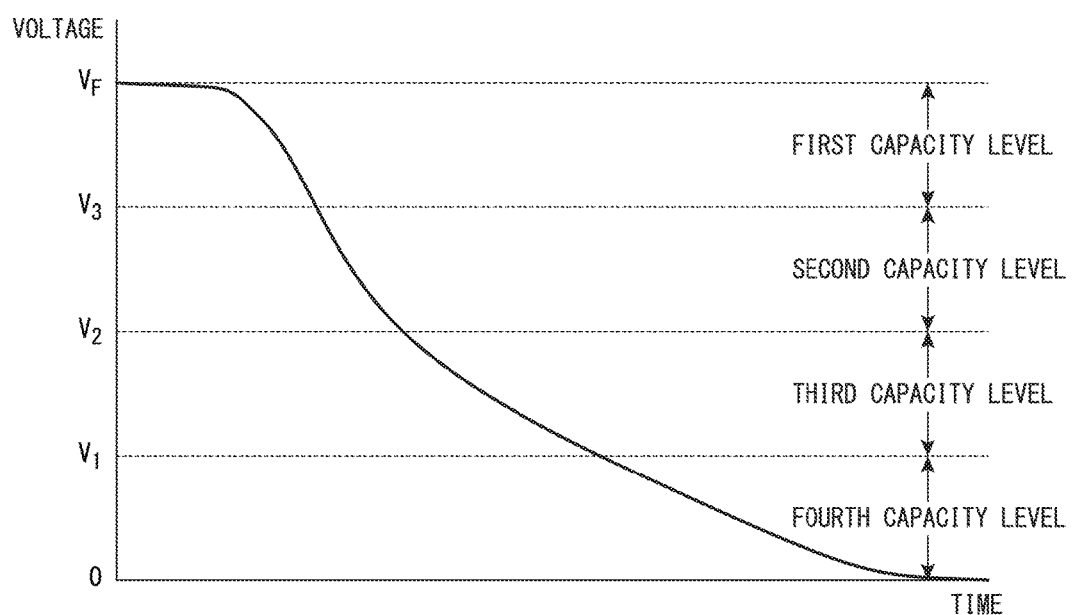
FIG. 12 is a diagram illustrating an example of change in a voltage (a battery voltage) according to passage of time in a battery provided in the terminal according to the first embodiment.

The capacity of the battery is shown as a change in the voltage of the battery. FIG. 12 illustrates an example of change in the voltage of the battery (the battery voltage) according to the passage of time when the battery is continuously used according to a certain fixed output. In this case, the capacity decreases according to the passage of time because the battery continuously outputs power. According to FIG. 12, the battery voltage decreases according to the passage of time. That is, a change is made so that the battery voltage also decreases when the capacity of the battery decreases. Also, the capacity of the battery uniquely corresponds to the battery voltage.

Therefore, the state-of-charge detection unit 254 in the present embodiment detects the battery voltage to detect the capacity of the battery. The application control unit 31 inputs the battery voltage detected by the state-of-charge detection unit 254.

In the present embodiment, a range from a battery voltage $V_F$ corresponding to a fully charged state to 0 V is set so that the range is divided into four capacity levels of first to fourth capacity levels in descending order of a battery voltage. The first capacity level is a range from the battery voltage $V_F$ to a battery voltage $V_3$, the second capacity level is a range from the battery voltage $V_3$ to a battery voltage $V_2$, the third capacity level is a range from the battery voltage $V_2$ to a battery voltage $V_1$, and the fourth capacity level is a range from the battery voltage $V_1$ to 0 V.

Also, it is only necessary to set values serving as the battery voltages $V_1$, $V_2$, and $V_3$ on the basis of characteristics of a correspondence relationship between the battery voltage and the duration of the battery and the like. Accordingly, an example in which the voltage range from the battery voltage $V_F$ to 0 V is divided into four equal parts in correspondence with the first to fourth capacity levels is illustrated in FIG. 12, but voltage value intervals corresponding to the capacity levels need not be equal. Also, the number of capacity levels is not limited to four as illustrated in FIG. 12.

The application control unit 31 determines one of the first to fourth capacity levels corresponding to the battery voltage input from the state-of-charge detection unit 254. Next, the application control unit 31 determines the number of activatable applications corresponding to the determined capacity level as follows.

The reminder database 23 stores a number-of-activatable-applications table. FIG. 13 is a diagram illustrating an example of the number-of-activatable-applications table.

The number-of-activatable-applications table of FIG. 13 has a structure in which the different number of activatable applications $M_1$, $M_2$, $M_3$, and $M_4$ correspond to the first capacity level, the second capacity level, the third capacity level, and the fourth capacity level, respectively.

Here, the numbers of activatable applications $M_1$, $M_2$, $M_3$, and $M_4$ are positive integers having a relationship of $M_1 > M_2 > M_3 > M_4$. Also, the number of activatable applications $M_1$ may indicate an indefinite value in place of a positive integer (that is, there is no limitation on the number of activatable applications).

The application control unit 31 determines the number of activatable applications corresponding to the determined capacity level by referring to the number-of-activatable-applications table. As a specific example, when it is determined that the capacity level is the second capacity level, the application control unit 31 may acquire the number of activatable applications $M_2$ associated with the second capacity level from the number-of-activatable-applications table. Thus, the application control unit 31 determines the number of activatable applications.

If the number of activatable applications is determined, the application control unit 31 determines whether the number of applications currently being operated is greater than the determined number of activatable applications. Here, an example in which the number of activatable applications is the number of applications from which the reminder application is excluded is given.

If the number of applications currently being operated is less than or equal to the number of activatable applications, the application control unit 31 does not particularly perform control for stopping the application.

On the other hand, if the number of applications currently being operated is greater than the number of activatable applications, the application control unit 31 selects an application which is a stop target from among applications currently being operated as follows. The number of applications which are stop targets (the number of stop target applications) is obtained by subtracting the number of activatable applications from the number of applications currently being operated. The application control unit 31 selects applications equal in number to stop target applications in ascending order of a priority level from the applications currently being operated. The applications selected as described above are applications which are stop targets.

The application control unit 31 displays a stop confirmation screen as a reminder application screen if the application which is the stop target is selected as described above.

FIG. 14 is a diagram illustrating an example of a stop confirmation screen. The stop confirmation screen is a screen for allowing the user to confirm an application selected as a stop target. More specifically, the stop confirmation screen is a screen for presenting the application selected as the stop target to the user and allowing the user to set whether to stop the application which is the stop target.

In the stop confirmation screen of FIG. 14, a message area AR11 is arranged. The message area AR11 is an area for displaying a message for notifying the user that the capacity of the battery is decreased and stopping another application is a preferred situation and asking the user to confirm whether to stop the application.

Also, in the stop confirmation screen, a stop target application presentation area AR12 is arranged. The stop target application presentation area AR12 is an area for displaying the application selected as the stop target. In FIG. 14, in the stop target application presentation area AR12, an example in which two applications of an application A and an application E are presented as applications which are stop targets is shown.

Also, it is only necessary for the terminal 2 to provide a notification to the user using, for example, a sound, vibration, or the like, when the stop confirmation screen is displayed.

The user viewing the stop confirmation screen of FIG. 14 can ascertain that the applications which are stop targets are the application A and the application E. In addition, the user determines whether it is necessary to stop the application A and the application E.

If the user determines that it is necessary to stop the application A and the application E (to approve stopping), a touch operation is performed on a "yes" button BT11 arranged in the stop confirmation screen in order to take into account the intention of the approval of the stop. If the touch operation is performed on the "yes" button BT11, the terminal 2 stops the application A and the application E. In this case, the application A and the application B are stopped and therefore it is possible to reduce the power consumption and lengthen the duration of the battery.

On the other hand, if the user does not determine to stop, for example, the application A and the application E, for a reason that they are currently being used or the like, the touch operation is performed on a "no" button BT12 arranged in the stop confirmation screen in order to take into account the intention of rejection of the stop. If the touch operation is performed on the "no" button BT12, the terminal 2 continues the current operation without stopping the application A and the application E. In this case, the power consumption is not reduced, but usability is not lost because the application A and the application E operate as desired by the user.

Also, if a plurality of applications are presented as the stop targets as in the stop confirmation screen of FIG. 14, the approval/rejection of stopping for each presented application may be set.

A processing procedure to be executed for application control by the terminal 2 of the present embodiment will be described with reference to the flowchart of FIG. 15. Also, the process of FIG. 15 is executed at each fixed time interval.

(Step S301) The application control unit 31 of the terminal 2 inputs a battery voltage as a state of charge detected by the state-of-charge detection unit 254.

(Step S302) The application control unit 31 sets, for example, any capacity level of the first to fourth capacity levels illustrated in FIG. 12, according to the battery voltage input in step S301.

(Step S303) Next, the application control unit 31 determines whether the battery is currently being charged. The state-of-charge detection unit 254 also detects whether the battery is being charged as the state of charge. The application control unit 31 can perform the determination of step S303 on the basis of a detection result of the state-of-charge detection unit 254 regarding whether the battery is being charged.

(Step S304) If it is determined that the battery is being charged (step S303; YES), the application control unit 31 increments the capacity level set in step S302 by one level. As a specific example, if the third capacity level is set in step S302, the application control unit 31 changes the setting to the second capacity level which is one level higher than the third capacity level in step S304.

When the battery is being charged, a battery capacity after the present is higher than the current battery capacity and a surplus is likely to occur. Therefore, if the capacity level is incremented by one level in step S304, it is possible to take into account a state in which the surplus occurs in the battery capacity in the setting of the capacity level as described above.

On the other hand, if it is determined that the battery is not being charged (step S303; NO), step S304 is skipped. In this case, the result set in step S302 is used as the capacity level.

(Step S305) The application control unit 31 determines the number of activatable applications $N_1$ corresponding to the set capacity level with reference to the number-of-activatable-applications table stored by the reminder database 23.

(Step S306) Also, the application control unit 31 determines the number of applications (the number of applications in operation) $N_2$ already activated and currently being operated.

(Step S307) The application control unit 31 determines whether the number of applications $N_2$ in operation determined in step S306 is greater than the number of activatable applications $N_1$ determined in step S305.

(Step S308) If the number of applications $N_2$ in operation is greater than the number of activatable applications $N_1$ (step S307; YES), there are applications which are the stop targets. Therefore, in this case, the application control unit 31 selects ($N_2-N_1$) applications in ascending order of priority from among applications in operation. The applications selected as described above are applications which are stop targets.

(Step S309) The application control unit 31 causes the image display unit provided in the notification unit 29 to display the stop confirmation screen illustrated in FIG. 14. At this time, the application control unit 31 causes applications which are stop targets selected in step S308 to be displayed in the stop target application presentation area AR12 of the stop confirmation screen.

(Step S310) The application control unit 31 performs control related to the stopping of applications according to an operation on the stop confirmation screen.

That is, the application control unit 31 performs control for stopping the applications which are the stop targets if an operation of setting stopping of the applications which are the stop targets presented in the stop target application presentation area AR12 is performed. On the other hand, the application control unit 31 causes the operation to continue without stopping the applications which are the stop targets if an operation in which the stopping is not set for the applications which are the stop targets presented in the stop target application presentation area AR12 is performed.

If it is determined that the number of applications $N_2$ in operation is less than or equal to the number of activatable applications $N_1$ (step S307; NO), the applications which are the stop targets are eliminated. Therefore, in this case, the application control unit 31 ends the process of FIG. 15 by skipping the processes of steps 308 to S310.

According to this process, the application control in the present embodiment is implemented.

Second Embodiment

Next, the second embodiment will be described. A condition of a reminder notification of the present embodiment includes an element of a distance of a current position from a target position indicating that the current position is in a predetermined range including a target position. In consideration thereof, the requirement for the terminal 2 to be reliably operated without causing battery exhaustion is high when the current position is closer to the target position.

Therefore, in the present embodiment, correction is performed so that the number of activatable applications based on the battery capacity is more limited when the current position is closer to the target position. Thereby, the number of activatable applications is set to be smaller than the number based on the battery capacity when the current position is closer to the target position. As a result, it is possible to maintain the battery capacity longer in a situation in which the current position is close to the target position. It is difficult for the battery to become exhausted in the terminal 2 in the situation in which the current position is close to the target position.

In the present embodiment, for example, a plurality of areas according to each predetermined distance range having the target position as a reference are set.

Figures 16, 17:
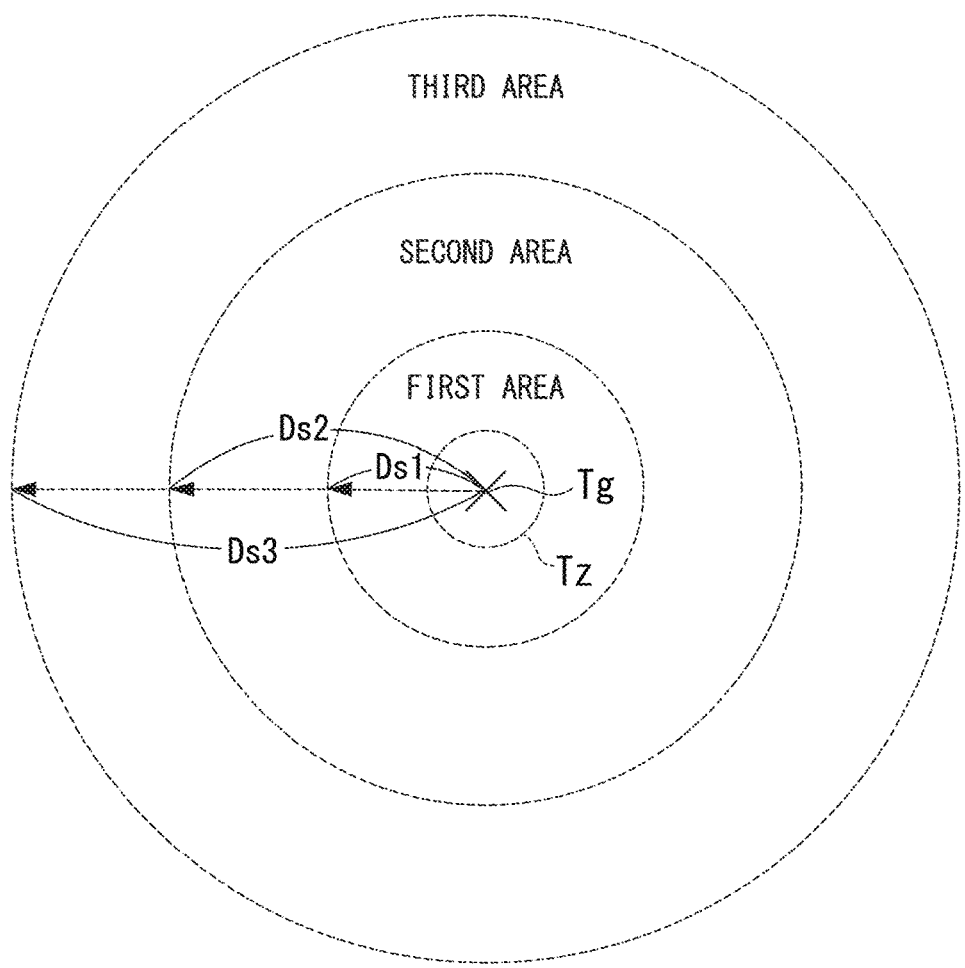
FIG. 16 is a diagram illustrating an example of area setting according to a second embodiment.
FIG. 17 is a diagram illustrating an example of a correction value table according to the second embodiment.

FIG. 16 is a diagram illustrating an example of area setting according to the present embodiment. In FIG. 16, an area having a radius to a distance Ds1 around the target position Tg is designated as a first area. Here, a predetermined range in which a reminder notification is provided indicated by a circle Tz in FIG. 6 is included in the first area as illustrated in FIG. 16.

Also, a range from the distance Ds1 to a distance Ds2 around the target position Tg outside the first area is designated as a second area. Also, a range from the distance Ds2 to a distance Ds3 around the target position Tg is designated as a third area.

In the present embodiment, the reminder database 23 stores a correction value table in which a correction value corresponds to each area after three areas with the target position as a reference (a center) are set as described above.

FIG. 17 is a diagram illustrating an example of a correction value table. The correction value table of FIG. 17 is a structure in which correction values $\alpha_1$, $\alpha_2$, and $\alpha_3$ are stored in correspondence with the first area, the second area, and the third area set as illustrated in FIG. 16.

Here, all the correction values $\alpha_1$, $\alpha_2$, and $\alpha_3$ are negative numbers and there is a relationship of $\alpha_1 < \alpha_2 < \alpha_3$. As a specific example, $\alpha_1 = -3$, $\alpha_2 = -2$, and $\alpha_3 = -1$ can set.

Also, in this case, significant correction is not performed when the current position is in an area outside the third area. That is, in this case, the correction value is 0.

Also, the number of areas and the number of correction values according to the number of areas are not particularly limited.

An example of a processing procedure to be executed by the terminal 2 in relation to application control in the present embodiment will be described with reference to a flowchart of FIG. 18. Also, the process of FIG. 18 is executed at each of fixed time intervals.

Figure 18:
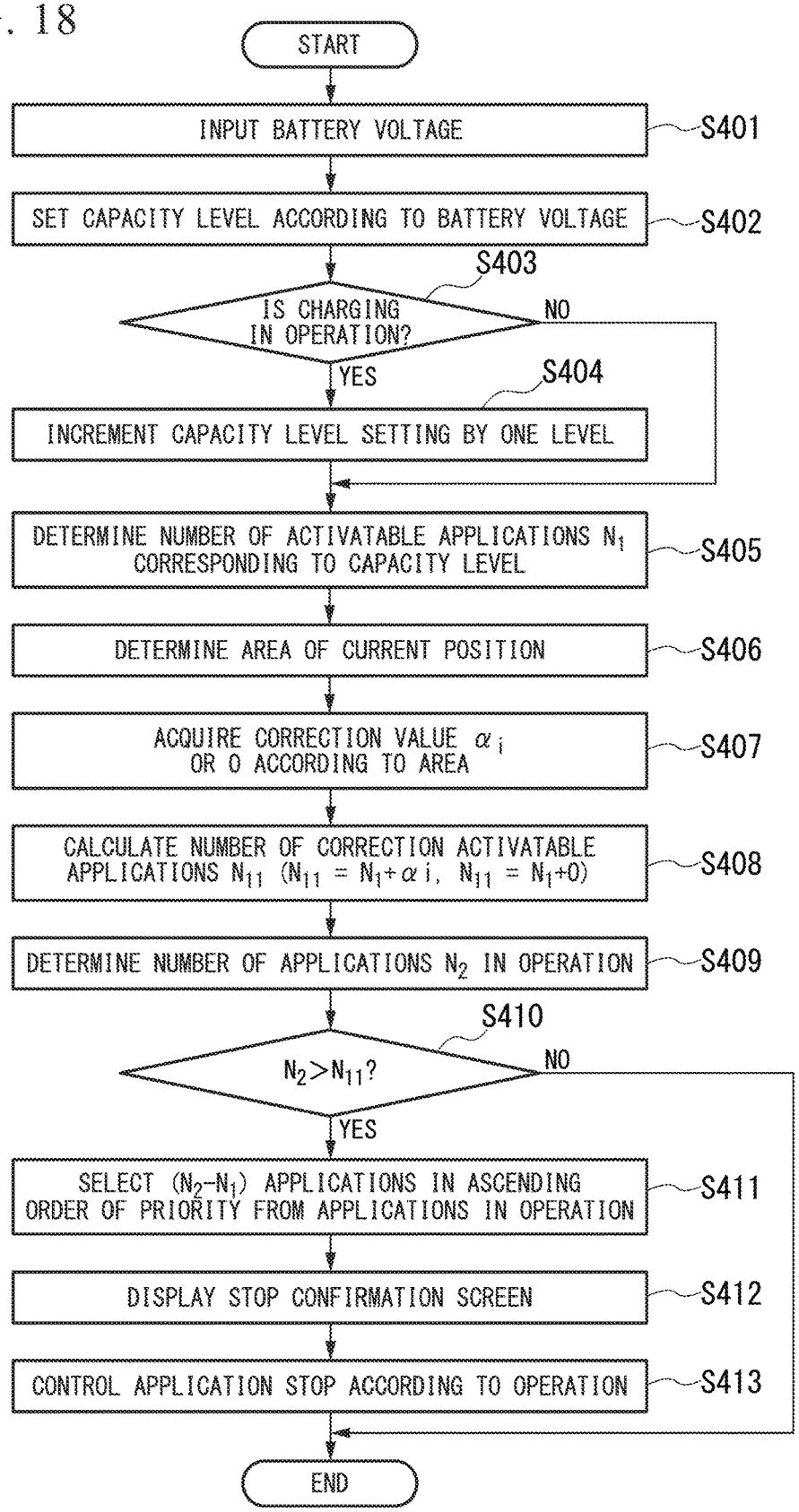
FIG. 18 is a flowchart illustrating an example of a processing procedure to be executed by a terminal according to the second embodiment in relation to application control.

Because the processes of steps S401 to S405 in FIG. 18 are similar to steps S301 to S305 of FIG. 15, description thereof will be omitted here.

(Step S406) The application control unit 31 determines an area including the current position of the terminal 2. Thus, the application control unit 31 acquires the current position of the terminal 2 from the GPS unit 251. The current position measured by the GPS unit 251 is indicated by coordinates according to latitude and longitude. Also, the application control unit 31 may acquire a target position indicated by the coordinates according to the latitude and longitude from the reminder database 23.

The application control unit 31 calculates a distance from the current position to the target position using the coordinates of the current position and the target position acquired as described above. The application control unit 31 determines one of the first area, the second area, the third area, and an area outside the third area corresponding to a distance range corresponding to the calculated distance. As described above, the application control unit 31 can determine an area including the current position of the terminal 2.

(Step S407) The application control unit 31 acquires a correction value according to the area determined in step S406 with reference to the correction value table stored by the reminder database 23. Specifically, the application control unit 31 acquires the correction value $\alpha_i$ (i is one of 1, 2, and 3) according to the determined area if the area determined in step S406 is one of the first to third areas. The application control unit 31 acquires "0" as the correction value if the area determined in step S406 is outside the third area.

(Step S408) The application control unit 31 calculates the number of correction activatable applications $N_{11}$ by performing correction based on the correction value acquired in step S407 for the number of activatable applications $N_1$ determined in step S405.

The application control unit 31 calculates the number of correction activatable applications $N_{11}$ according to $N_{11} = N_1 + \alpha_i$ if the correction value acquired in step S407 is $\alpha_i$.

Also, the application control unit 31 calculates the number of correction activatable applications $N_{11}$ according to $N_{11} = N_1 + 0$ if the correction value acquired in step S407 is 0.

(Step S409) Also, the application control unit 31 determines the number of applications $N_2$ in operation.

(Step S410) The application control unit 31 determines whether the number of applications $N_2$ in operation determined in step S409 is greater than the number of correction activatable applications $N_{11}$ calculated in step S408.

If it is determined that the number of applications $N_2$ in operation is greater than the number of correction activatable applications $N_{11}$ (step S410; YES), the application control unit 31 executes the processes of steps S411 to S413. Because the processes of steps S411 to S413 are similar to steps S308 to S310 of FIG. 15, description thereof will be omitted here.

If it is determined that the number of applications $N_2$ in operation is less than or equal to the number of correction activatable applications $N_{11}$ in step S410 (step S410; NO), the process of FIG. 18 ends by skipping the processes of step S411 to S413.

According to this process, the application control in the present embodiment is implemented.

Also, in the above-described present embodiment, the application which is the stop target is selected after a priority level is set for an application installed in the terminal 2 according to an operation of the user.

However, in the present embodiment, the priority level may not be set for the application. If the priority level is not set for the application, the selection of the application which is the stop target may be set, for example, randomly.

Alternatively, for example, a usage history may be stored for applications installed in the terminal 2. In addition, the terminal 2 may be configured to exclude applications equal in number to activatable applications selected in descending order of a priority level from the stop targets on the basis of the use history and select the remaining applications as the stop targets.

Also, for example, the terminal 2 may store information about power consumption per unit time when an application is activated, exclude applications equal in number to activatable applications selected in ascending order of power consumption from the stop targets, and select the remaining applications as the stop targets.

Also, in a state in which the operation of the application selected as the stop target is stopped, the activation of the application which is not currently operating according to an operation of the user or the occurrence of a predetermined trigger may be indicated.

In this case, the application control unit 31 may cause a dialog screen (an activation selection screen) for allowing the user to select whether or not to activate an application indicated to be activated at this time to be displayed.

If an operation of selecting the activation has been performed on the activation selection screen, the application control unit 31 activates the application indicated to be activated as it is. On the other hand, the application control unit 31 performs control so that the application indicated to be activated is not activated if an operation of selecting that the activation is not performed has been performed on the activation selection screen.

Also, an example in which the terminal 2 acquires and transmits current position information has been described in each embodiment described above, but information to be acquired and transmitted may be current time information or sensor information. Also in this case, an effect similar to the above-described effect is obtained.

Also, an example in which the first condition is the target position information and the second condition is the target time information as the example of the notification condition information has been described in each embodiment described above, but the present invention is not limited thereto. The notification condition is not limited to these two conditions, and may include, for example, information indicating an objective of a notification of a reminder or the like. Also, the first condition may be the target time information and the second condition may be the target position information.

Also, the above-described process may be performed by recording a program for implementing some or all functions of the terminal 2 or the information processing device 4 provided in the information processing system 1 in the present invention on a computer-readable recording medium and causing a computer system to read and execute the program recorded on the recording medium. Also, the "computer system" used here is assumed to include an operating system (OS) and hardware such as peripheral devices. Also, the computer system is assumed to include a World Wide Web (WWW) system having a homepage providing environment (or displaying environment). In addition, the "computer-readable recording medium" refers to a storage apparatus including a flexible disk, a magneto-optical disc, a read only memory (ROM), or a portable medium such as a compact disc (CD)-ROM, and a hard disk embedded in the computer system. Furthermore, the "computer-readable recording medium" is assumed to include a medium that holds a program for a certain period of time, such as a volatile memory (random access memory (RAM)) inside a computer system serving as a server or a client when the program is transmitted via a network such as the Internet or a communication circuit such as a telephone circuit.

Also, the above-described program may be transmitted from a computer system storing the program in a storage apparatus or the like via a transmission medium or transmitted to another computer system by transmission waves in a transmission medium. Here, the "transmission medium" for transmitting the program refers to a medium having a function of transmitting information, such as a network (communication network) like the Internet or a communication circuit (communication line) like a telephone circuit. Also, the above-described program may be a program for implementing some of the above-described functions. Further, the above-described program may be a program capable of implementing the above-described functions in combination with a program already recorded on the computer system, i.e., a so-called differential file (differential program).

For example, the user operates the terminal 2 and downloads an application for causing the terminal 2 to perform the above-described process from, for example, the Internet. The terminal 2 may implement some of functional units provided in the terminal 2 by installing the downloaded application in the device itself.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information processing system including a terminal and an information processing device, wherein the terminal includes:
   a condition information generation unit, implemented via a processing unit, configured to acquire a first condition and a second condition and generate condition information using at least one of the acquired first and second conditions;
   a state information generation unit, implemented via the processing unit, configured to acquire information based on each of the first condition and the second condition and generate state information using information according to the condition information among the acquired information;
   a transmission unit, implemented via the processing unit, configured to transmit the condition information to the information processing device and transmit the state information to the information processing device at predetermined time intervals;
   a reception unit, implemented via the processing unit, configured to receive notification information from the information processing device;
   a reminder generation unit, implemented via the processing unit, configured to generate a reminder if it is determined that the state information satisfies one of the first condition and the second condition when the notification information is received;
   a notification unit, implemented via the processing unit, configured to provide a notification of the generated reminder;
   a state-of-charge detection unit, implemented via the processing unit, configured to detect a state of charge in the terminal; and
   an application control unit, implemented via the processing unit, configured to control an application which operates in the terminal according to the state of charge detected by the state-of-charge detection unit, and
   wherein the information processing device includes:
   an acquisition unit, implemented via a second processing unit, configured to acquire the condition information and the state information transmitted by the terminal;
   a condition determination unit, implemented via the second processing unit, configured to generate the notification information if it is determined that the acquired state information satisfies one of the first condition and the second condition included in the condition information; and an output unit, implemented via the second processing unit, configured to transmit the notification information to the terminal.

2. The information processing system according to claim 1, further including:

a priority setting unit, implemented via the processing unit, configured to set priorities for applications, wherein the application control unit determines an application which is a stop target according to the state of charge detected by the state-of-charge detection unit from among applications in operation on the basis of the priorities set by the priority setting unit.

3. The information processing system according to claim 2, wherein the application control unit sets the number of simultaneously operable applications according to the state of charge detected by the state-of-charge detection unit.

4. The information processing system according to claim 3, wherein the application control unit corrects the number of simultaneously operable applications on the basis of a distance between a target position indicated by target position information and a current position of the terminal as the first condition.

5. The information processing system according to claim 1, wherein the application control unit displays a stop confirmation screen for allowing a user to confirm whether to stop an application determined to be a stop target from among applications in operation according to the state of charge detected by the state-of-charge detection unit and stops the application designated to be stopped on the basis of an operation performed on the stop confirmation screen.

6. The information processing system according to claim 5, wherein the application control unit continues an operation on an application which is not designated to be stopped on the basis of an operation performed on the stop confirmation screen.

7. A terminal comprising:

a condition information generation unit, implemented via a processing unit, configured to acquire a first condition and a second condition and generate condition information using at least one of the acquired first and second conditions;

a state information generation unit, implemented via the processing unit, configured to acquire information based on each of the first condition and the second condition and generate state information using information according to the condition information among the acquired information;

a transmission unit, implemented via the processing unit, configured to transmit the condition information to the information processing device and transmit the state information to the information processing device at predetermined time intervals;

a reception unit, implemented via the processing unit, configured to receive notification information from the information processing device;

a reminder generation unit, implemented via the processing unit, configured to generate a reminder if it is determined that the state information satisfies one of the first condition and the second condition when the notification information is received;

a notification unit, implemented via the processing unit, configured to provide a notification of the generated reminder;

a state-of-charge detection unit, implemented via the processing unit, configured to detect a state of charge in the terminal; and an application control unit, implemented via the processing unit, configured to control an application which operates in the terminal according to the state of charge detected by the state-of-charge detection unit.

8. An information processing method in an information processing system including a terminal and an information processing device, the information processing method comprising:

a condition information generation procedure in which a condition information generation unit of the terminal, implemented via a processing unit, acquires a first condition and a second condition and generates condition information using at least one of the acquired first and second conditions;

a state information generation procedure in which a state information generation unit of the terminal, implemented via the processing unit, acquires information based on each of the first condition and the second condition and generates state information using information according to the condition information among the acquired information;

a transmission procedure in which a transmission unit of the terminal, implemented via the processing unit, transmits the condition information to the information processing device and transmits the state information to the information processing device at predetermined time intervals;

a reception procedure in which a reception unit of the terminal, implemented via the processing unit, receives notification information from the information processing device;

a reminder generation procedure in which a reminder generation unit of the terminal, implemented via the processing unit, generates a reminder if it is determined that the state information satisfies one of the first condition and the second condition when the notification information is received;

a notification procedure in which a notification unit of the terminal provides a notification of the generated reminder;

a state-of-charge detection procedure in which a state-of-charge detection unit of the terminal, implemented via the processing unit, detects a state of charge in the terminal;

an application control procedure in which an application control unit of the terminal, implemented via the processing unit, controls an application which operates in the terminal according to the state of charge detected by the state-of-charge detection unit;

an acquisition procedure in which an acquisition unit of the information processing device, implemented via a second processing unit, acquires the condition information and the state information transmitted by the terminal;

a condition determination procedure in which a condition determination unit of the information processing device, implemented via the second processing unit, generates the notification information if it is determined that the acquired state information satisfies one of the first condition and the second condition included in the condition information; and an output procedure in which an output unit of the information processing device, implemented via the second processing unit, transmits the notification information to the terminal.

9. An information processing method of a terminal, the information processing method comprising:
a condition information generation procedure in which a condition information generation unit, implemented via a processing unit, acquires a first condition and a second condition and generates condition information using at least one of the acquired first and second conditions;
a state information generation procedure in which a state information generation unit, implemented via the processing unit, acquires information based on each of the first condition and the second condition and generates state information using information according to the condition information among the acquired information;
a transmission procedure in which a transmission unit, implemented via the processing unit, transmits the condition information to the information processing device and transmits the state information to the information processing device at predetermined time intervals;
a reception procedure in which a reception unit, implemented via the processing unit receives notification information from the information processing device;
a reminder generation procedure in which a reminder generation unit, implemented via the processing unit, generates a reminder if it is determined that the state information satisfies one of the first condition and the second condition when the notification information is received;
a notification procedure in which a notification unit, implemented via the processing unit, provides a notification of the generated reminder;
a state-of-charge detection procedure in which a state-of-charge detection unit, implemented via the processing unit, detects a state of charge in the terminal; and
an application control procedure in which an application control unit, implemented via the processing unit, controls an application which operates in the terminal according to the state of charge detected in the state-of-charge detection procedure.

10. A non-transitory computer-readable recording medium comprising computer-executable instructions, which when executed via a processing unit on a computer performs acts, comprising:
a condition information generation procedure of acquiring a first condition and a second condition and generating condition information using at least one of the acquired first and second conditions;
a state information generation procedure of acquiring information based on each of the first condition and the second condition and generating state information using information according to the condition information among the acquired information;
a transmission procedure of transmitting the condition information to the information processing device and transmitting the state information to the information processing device at predetermined time intervals;
a reception procedure of receiving notification information from the information processing device;
a reminder generation procedure of generating a reminder if it is determined that the state information satisfies one of the first condition and the second condition when the notification information is received;
a notification procedure of providing a notification of the generated reminder;
a state-of-charge detection procedure of detecting a state of charge in the terminal; and
an application control procedure of controlling an application which operates in the terminal according to the state of charge detected in the state-of-charge detection procedure.

* * * * *